United States Patent
Sagasaki

(10) Patent No.: US 11,940,772 B2
(45) Date of Patent: Mar. 26, 2024

(54) NUMERICAL CONTROLLER AND INDUSTRIAL MACHINE CONTROL SYSTEM

(71) Applicant: Mitsubishi Electric Corporation, Tokyo (JP)

(72) Inventor: Masakazu Sagasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/928,931

(22) PCT Filed: Sep. 11, 2020

(86) PCT No.: PCT/JP2020/034541
§ 371 (c)(1),
(2) Date: Dec. 1, 2022

(87) PCT Pub. No.: WO2022/054245
PCT Pub. Date: Mar. 17, 2022

(65) Prior Publication Data
US 2023/0195073 A1     Jun. 22, 2023

(51) Int. Cl.
*G05B 19/402*     (2006.01)

(52) U.S. Cl.
CPC .. *G05B 19/402* (2013.01); *G05B 2219/35519* (2013.01); *G05B 2219/37443* (2013.01)

(58) Field of Classification Search
None
See application file for complete search history.

(56) References Cited

U.S. PATENT DOCUMENTS

| | | | |
|---|---|---|---|
| 2004/0232866 A1 | 11/2004 | Greff et al. | |
| 2005/0283270 A1* | 12/2005 | Nakamura | G05B 19/4069 700/178 |
| 2011/0295408 A1* | 12/2011 | Burgel | G05B 19/401 700/192 |

FOREIGN PATENT DOCUMENTS

| | | |
|---|---|---|
| JP | S60-20895 A | 2/1985 |
| JP | H09-230918 A | 9/1997 |
| JP | 2010-052116 A | 3/2010 |
| JP | 2015-160253 A | 9/2015 |
| WO | 2016/157395 A1 | 10/2016 |

OTHER PUBLICATIONS

International Search Report and Written Opinion mailed on Nov. 10, 2020, received for PCT Application PCT/ JP2020/034541, filed on Sep. 11, 2020, 9 pages including English Translation.
Decision to Grant dated May 11, 2021, received for JP Application 2021-507725, 5 pages including English Translation.

* cited by examiner

*Primary Examiner* — Sean Shechtman
(74) *Attorney, Agent, or Firm* — XSENSUS LLP

(57) ABSTRACT

A numerical controller includes a coordinate management unit that updates machine origin offset data indicating a positional relationship between a machine origin of a machine tool and a machine origin of a robot depending on movement of the machine origin of the machine tool or the machine origin of the robot; and an interference check processing unit that detects interference between the machine tool and the robot on the basis of a position of a first interference definition area and a position of a second interference definition area, and the updated machine origin offset data.

10 Claims, 15 Drawing Sheets

NUMERICAL CONTROLLER AND INDUSTRIAL MACHINE CONTROL SYSTEM

Cross-Reference To Related Application

The present application is based on PCT filing PCT/JP2020/034541, filed Sep. 11, 2020, the entire contents of which are incorporated herein by reference.

FIELD

The present disclosure relates to a numerical controller that controls a first industrial machine and a second industrial machine, and an industrial machine control system.

BACKGROUND

A numerical controller that simultaneously controls a plurality of industrial machines including a machine tool, a robot, and the like has been proposed.

Patent Literature 1 discloses that, in a production line, two robot arms arranged such that operation areas thereof overlap each other generate respective trajectories from a start point to a target point of the two robot arms while avoiding collision with each other.

CITATION LIST

Patent Literature

Patent Literature 1: Japanese Patent Application Laid-open No. 2015-160253

SUMMARY

Technical Problem

However, in Patent Literature 1, pedestals of robots are fixed, and in a case where the pedestals of the robots move, trajectories from the start point to the target point of the two robot arms cannot be generated while avoiding collision with each other, and there is a possibility that the two robot arms interfere with each other. That is, in Patent Literature 1, in a case where at least one of a pedestal of a first industrial machine and that of a second industrial machine moves, interference between the first industrial machine and the second industrial machine cannot be avoided. In addition, in a case where the interference between the first industrial machine and the second industrial machine is detected using a visual device, a system configuration becomes expensive.

The present disclosure has been made in view of the above, and an object thereof is to provide a numerical controller capable of avoiding interference between a first industrial machine and a second industrial machine even in a case where at least one of a pedestal of the first industrial machine and that of the second industrial machine moves.

Solution to Problem

To solve the problem and achieve the object described above, a numerical controller according to the present disclosure controls a first industrial machine having a first coordinate system and a second industrial machine having a second coordinate system and being movable. The numerical controller includes a coordinate management unit to update machine origin offset data indicating a positional relationship between a first machine origin that is a machine origin of the first industrial machine and a second machine origin that is a machine origin of the second industrial machine depending on movement of the first machine origin or the second machine origin, and an interference check processing unit to detect interference between the first industrial machine and the second industrial machine on a basis of a position in the first coordinate system of a first interference definition area obtained by modeling the first industrial machine, a position in the second coordinate system of a second interference definition area obtained by modeling the second industrial machine, and the updated machine origin offset data.

Advantageous Effects of Invention

The numerical controller of the present disclosure achieves an effect that it is possible to avoid interference between a first industrial machine and a second industrial machine even in a case where at least one of a pedestal of the first industrial machine and that of the second industrial machine moves.

BRIEF DESCRIPTION OF DRAWINGS

FIG. 2 is a view illustrating how a pedestal of the robot according to the first embodiment moves, and the like.

FIG. 7 is a view illustrating a movement mechanism of the pedestal of the robot of a second embodiment, and the like.

DESCRIPTION OF EMBODIMENTS

Hereinafter, a numerical controller and an industrial machine control system according to each embodiment will be described in detail with reference to the drawings.

First Embodiment

Figure 1:
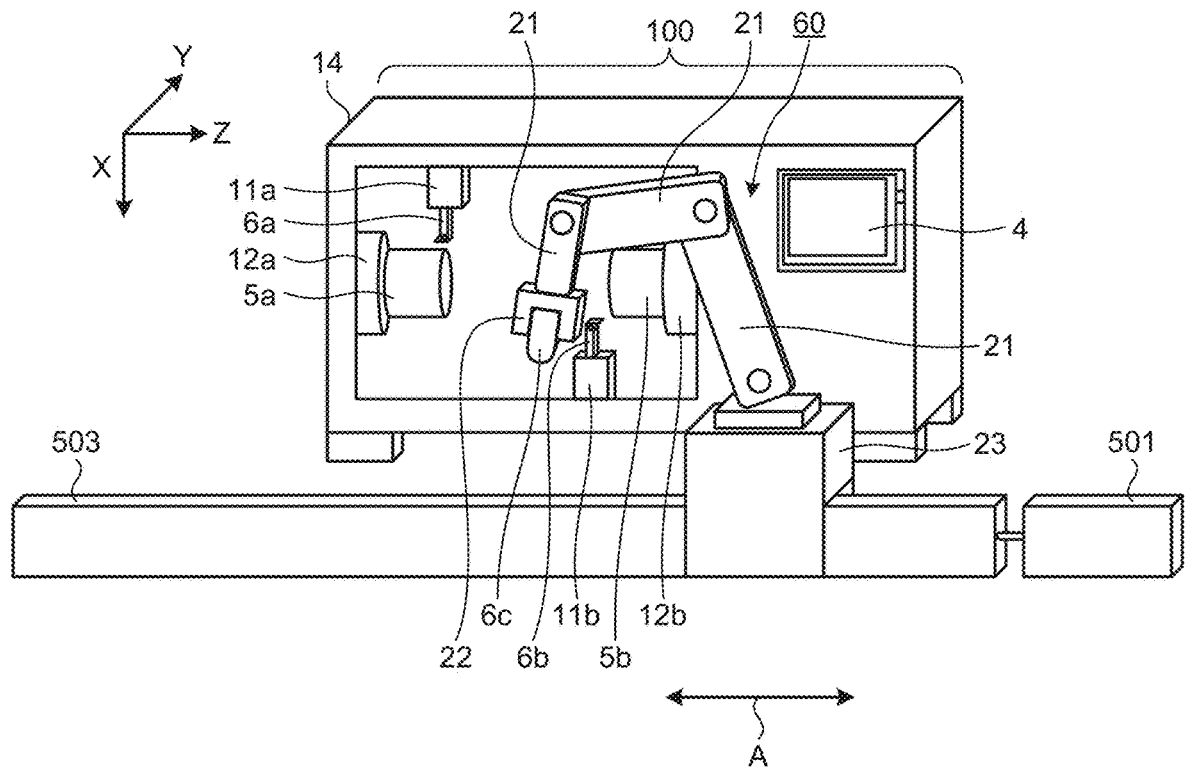
FIG. 1 is a view illustrating an example arrangement of a machine tool and a robot controlled by a numerical controller according to a first embodiment.

FIG. 1 is a view illustrating an example arrangement of a machine tool 100 as a first industrial machine and a robot 60 as a second industrial machine controlled by a numerical controller 1X according to a first embodiment. The machine tool 100 includes a housing 14, tool holders 11a and 11b, and chuck mechanisms 12a and 12b. In the machine tool 100, the inside of the housing 14 is a machining chamber for machining workpieces to be machined 5a and 5b. A display unit 4 is arranged on a front surface of the housing 14.

The chuck mechanism 12a holds the workpiece to be machined 5a in the machining chamber, and the chuck mechanism 12b holds the workpiece to be machined 5b in the machining chamber. The tool holder 11a holds a tool 6a, and the tool holder 11b holds a tool 6b. The tool 6a machines the workpiece to be machined 5a held by the chuck mechanism 12a, and the tool 6b machines the workpiece to be machined 5b held by the chuck mechanism 12b. As described above, the machine tool 100 includes a plurality of first axes for machining the workpieces to be machined 5a and 5b. The first axes include a movement axis of the tool holder 11a, a movement axis of the tool holder 11b, a rotation axis of the chuck mechanism 12a, and a rotation axis of the chuck mechanism 12b.

The robot 60 is arranged in the vicinity of the machine tool 100, and performs loading and unloading of the workpieces to be machined 5a and 5b onto and from the machine tool 100. In addition, the robot 60 machines the workpiece to be machined 5a held by the machine tool 100 with a tool 6c.

The robot 60 includes a robot arm 21, a robot hand 22, and a pedestal 23. The pedestal 23 pivotably holds the robot arm 21. The robot arm 21 includes a plurality of second axes and is rotatable about the respective second axes. The robot hand 22 is arranged at a distal end portion of the robot arm 21. The robot hand 22 grips the tool 6c or the workpieces to be machined 5a and 5b.

The pedestal 23 can reciprocate in an arrow A direction along the housing 14 of the machine tool 100. The arrow A direction corresponds to, for example, the Z-axis direction in a coordinate system of the machine tool 100. The pedestal 23 is mounted on a rotational movement conversion mechanism 503 that converts rotational motion into linear motion, for example, a ball screw. The rotational movement conversion mechanism 503 is coupled to a servomotor 501, and operates by the rotation of the servomotor 501.

Figure 2:
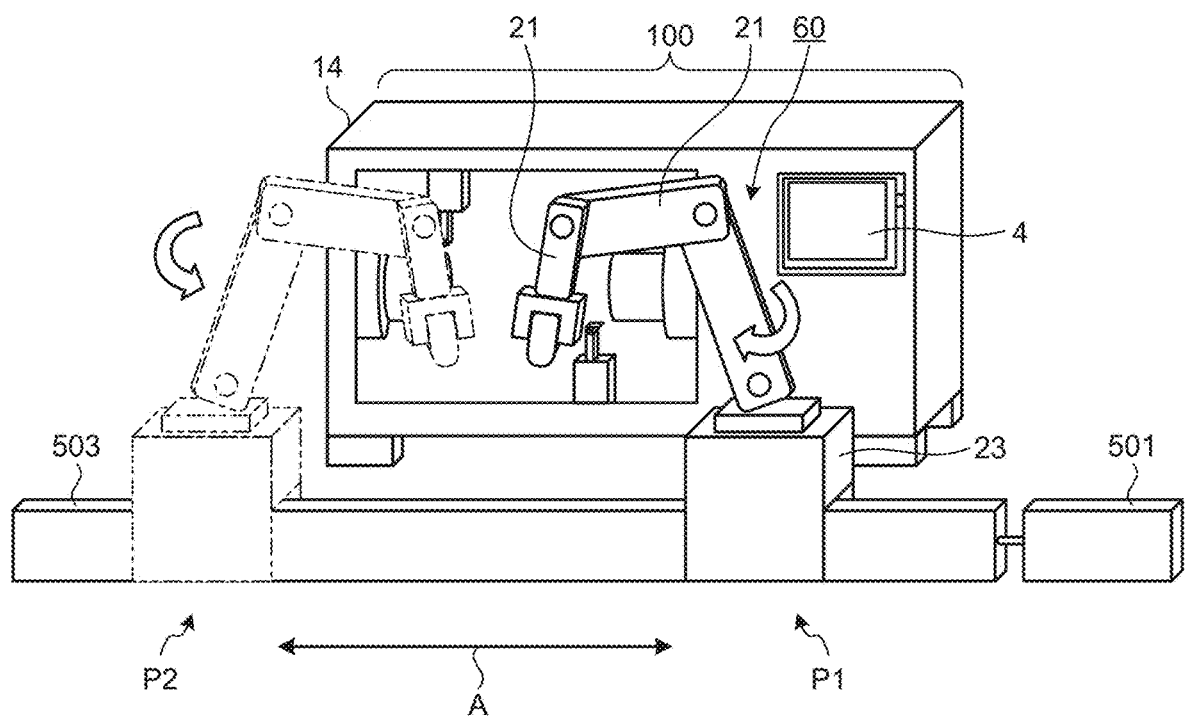

FIG. 2 is a view illustrating how the pedestal 23 of the robot 60 moves, and the like. In FIG. 2, the pedestal 23 of the robot 60 reciprocates in the arrow A direction between a first position P1 and a second position P2 by operations of the servomotor 501 and the rotational movement conversion mechanism 503. The robot arm 21 also operates while the pedestal 23 reciprocates between the first position P1 and the second position P2. In a case where the robot arm 21 moves while the pedestal 23 of the robot 60 is moving, the robot arm 21 may interfere with a fixed portion of the machine tool 100 or a movable portion of the machine tool 100. In the first embodiment, such interference is prevented in advance.

Figure 3:
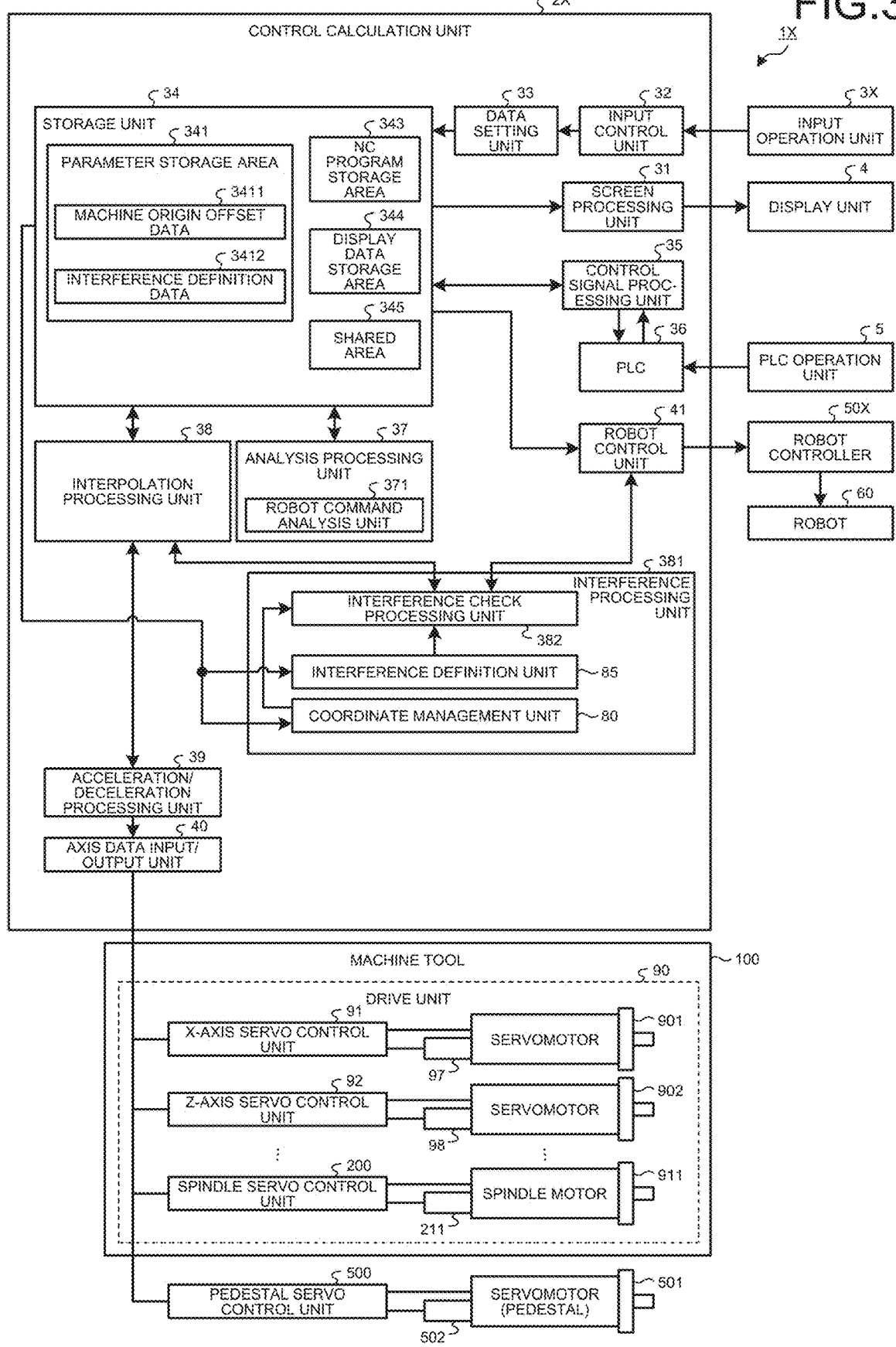
FIG. 3 is a block diagram illustrating an example configuration of the numerical controller according to the first embodiment.

FIG. 3 is a block diagram illustrating an example configuration of the numerical controller 1X according to the first embodiment. The numerical controller 1X controls the machine tool 100 and the robot 60. The numerical controller 1X includes a control calculation unit 2X, an input operation unit 3X, the display unit 4, and a PLC operation unit 5 such as a machine control panel for operating a programmable logic controller (PLC) 36. FIG. 3 illustrates the machine tool 100, a robot controller 50X, and the robot 60 together with the numerical controller 1X.

The machine tool 100 includes a drive unit 90 that drives the tools 6a and 6b and the workpieces to be machined 5a and 5b. The drive unit 90 is, for example, a drive mechanism that drives the tools 6a and 6b while rotating the workpieces to be machined 5a and 5b. In the first embodiment, the driving directions of the tools 6a and 6b are, for example, two directions of a direction parallel to the X-axis direction and a direction parallel to the Z-axis direction. Since the axial directions depend on the device configuration, the axial directions are not limited to the above directions.

The drive unit 90 includes a servomotor 901 that moves the tool 6a in the X-axis direction defined on the numerical controller 1X, a detector 97 that detects a position and a speed of the servomotor 901, and an X-axis servo control unit 91 that controls the servomotor 901 on the basis of a command from the numerical controller 1X. The X-axis servo control unit 91 performs feedback control on the servomotor 901 on the basis of the position and the speed from the detector 97. The drive unit 90 further includes a servomotor 902 that moves the tool 6a in the Z-axis direction, a detector 98 that detects a position and a speed of the servomotor 902, and a Z-axis servo control unit 92 that controls the servomotor 902 on the basis of a command from the numerical controller 1X. The Z-axis servo control unit 92 performs feedback control on the servomotor 902 on the basis of the position and the speed from the detector 98. The machine tool 100 includes two tool holders 11a and 11b, and includes two tools 6a and 6b. Therefore, the drive unit 90 includes an X-axis servo control unit (not illustrated), a servomotor (not illustrated), and a detector (not illustrated) to drive the tool 6b in the X direction, and further includes a Z-axis servo control unit (not illustrated), a servomotor (not illustrated), and a detector (not illustrated) to drive the tool 6b in the Z direction. Although not illustrated, a control mechanism for a Y axis or the like may be further included in order to drive the tool in the Y direction or the like, for example.

The drive unit 90 includes a spindle motor 911 that rotates a spindle for rotating the workpiece to be machined 5a, and a detector 211 that detects a position and a rotation speed of the spindle motor 911. The rotation speed detected by the detector 211 corresponds to the rotation speed of the spindle motor 911. The drive unit 90 further includes a spindle servo control unit 200 that controls the spindle motor 911 on the basis of a command from the numerical controller 1X. The spindle servo control unit 200 performs feedback control on the spindle motor 911 on the basis of the position and the rotation speed from the detector 211. The machine tool 100 includes two spindles and simultaneously machines the two workpieces to be machined 5a and 5b. Therefore, the drive unit 90 further includes a spindle motor (not illustrated), a spindle servo control unit (not illustrated), and a detector (not illustrated) to drive the workpiece to be machined 5b.

Furthermore, the numerical controller 1X of the first embodiment includes a servomotor 501 that moves the pedestal 23 of the robot 60 in the Z-axis direction defined on the numerical controller 1X, a detector 502 that detects a position and a speed of the servomotor 501, and a pedestal servo control unit 500 that controls the servomotor 501 on the basis of a command from the numerical controller 1X.

The input operation unit 3X inputs information to the control calculation unit 2X. The input operation unit 3X is constituted with an input means such as a keyboard, a button, or a mouse, and is used to receive an input of a command or the like to the numerical controller 1X by a user, or to receive a numerical control (NC) program, a parameter, or the like, and to perform input thereof to the control calculation unit 2X. The display unit 4 is constituted with a display means such as a liquid crystal display device, and displays information processed by the control calculation unit 2X on a display screen. An example of the display unit 4 is a liquid crystal touch panel. A part of the functions of the input operation unit 3X may be arranged on the display unit 4.

The control calculation unit 2X controls the machine tool 100 and the robot 60 using an NC program defined in the coordinate system of the machine tool 100. The control calculation unit 2X includes an input control unit 32, a data setting unit 33, a storage unit 34, a screen processing unit 31, an analysis processing unit 37, a control signal processing unit 35, the PLC 36, an interpolation processing unit 38, an acceleration/deceleration processing unit 39, an axis data input/output unit 40, a robot control unit 41, and an interference processing unit 381. The PLC 36 may be arranged outside the control calculation unit 2X.

The storage unit 34 includes a parameter storage area 341, an NC program storage area 343, a display data storage area 344, and a shared area 345. In the parameter storage area 341, parameters and the like used in a process performed by the control calculation unit 2X are stored. Specifically, control parameters, servo parameters, and tool data for operating the numerical controller 1X are stored in the parameter storage area 341. Furthermore, machine origin offset data 3411 which is data associating the machine origin of the machine tool 100 with the machine origin of the robot 60 is stored in the parameter storage area 341. Furthermore, interference definition data 3412 is stored in the parameter storage area 341.

In the NC program storage area 343, an NC program used for machining a workpiece to be machined is stored. The NC program of the first embodiment includes a movement command which is a command to move a tool of the machine tool 100, and a command for controlling the robot 60.

In the display data storage area 344, screen display data to be displayed on the display unit 4 is stored. The screen display data is data for displaying information on the display unit 4. In addition, the storage unit 34 includes the shared area 345 that temporarily stores data to be used.

The screen processing unit 31 performs control to display the screen display data stored in the display data storage area 344 on the display unit 4. The input control unit 32 receives information input from the input operation unit 3X. The data setting unit 33 stores the information received by the input control unit 32 in the storage unit 34.

The control signal processing unit 35 is connected to the PLC 36 and receives signal information of, for example, a relay for operating the machine of the machine tool 100 from the PLC 36. The control signal processing unit 35 writes the received signal information in the shared area 345 of the storage unit 34. The interpolation processing unit 38 refers to these pieces of signal information during machining operation. When the analysis processing unit 37 outputs an auxiliary command to the shared area 345, the control signal processing unit 35 reads the auxiliary command from the shared area 345 and transmits the auxiliary command to the PLC 36. The auxiliary command is a command other than a command to operate a drive axis which is a numerically-controlled axis. Examples of the auxiliary command include M code, B code, and T code.

The PLC 36 stores a ladder program in which a machine operation executed by the PLC 36 is described. When receiving an auxiliary command, the PLC 36 performs a process corresponding to the auxiliary command on the machine tool 100 in accordance with the ladder program. After performing the process corresponding to the auxiliary command, the PLC 36 transmits a completion signal indicating that machine control has been completed to the control signal processing unit 35 in order to execute the next block of the NC program.

In the control calculation unit 2X, the control signal processing unit 35, the analysis processing unit 37, the interpolation processing unit 38, the robot control unit 41, and the interference processing unit 381 are connected via the storage unit 34, and information is written and read via the storage unit 34. In the following description, when describing writing and reading of information performed among the control signal processing unit 35, the analysis processing unit 37, the interpolation processing unit 38, the robot control unit 41, and the interference processing unit 381, it may not be described that such writing and reading are performed via the storage unit 34.

The NC program is selected by the user inputting an NC program number through the input operation unit 3X. With a cycle start of the machine control panel or the like as a trigger, the analysis processing unit 37 reads the selected NC program number from the shared area 345, reads an NC program corresponding to the selected NC program number from the NC program storage area 343, and performs an analysis process on each block of the NC program. The analysis processing unit 37 analyzes, for example, G code (command related to axis movement or the like), M code (machine operation command), and the like.

In a case where an analyzed row includes the M code, the analysis processing unit 37 transmits a result of the analysis to the PLC 36 via the shared area 345 and the control signal processing unit 35. The PLC 36 executes machine control corresponding to the M code. When the execution is completed, a result indicating completion of the M code is written in the storage unit 34 via the control signal processing unit 35. The interpolation processing unit 38 refers to the execution result written in the storage unit 34.

In a case where an analyzed row includes the G code, the analysis processing unit 37 transmits a result of the analysis to the interpolation processing unit 38 via the shared area 345. Specifically, the analysis processing unit 37 generates a movement condition corresponding to the G code, and transmits the movement condition to the interpolation processing unit 38. The movement condition is a tool feed condition for moving a machining position, and is indicated by a speed at which each of the tool holders 11a and 11b is moved, a position at which each of the tool holders 11a and 11b is moved, and the like. For example, regarding the tool feed of the tools, the tools are advanced in the X-axis direction (+X direction) and the Z-axis direction (+Z direction).

The analysis processing unit 37 includes a robot command analysis unit 371. The robot command analysis unit 371 is a means that analyzes an operation of the robot 60 that is connected. The robot command analysis unit 371 analyzes a robot command included in the NC program, and transmits a result of the analysis to the robot control unit 41 via the shared area 345. The result of the analysis includes a robot coordinate system setting command which is a command for setting the coordinate system of the robot 60, and a robot operation command that defines an operation of the robot 60.

The interpolation processing unit 38 generates data for controlling the machine tool 100 using a command to the machine tool 100 in the result of the analysis by the analysis processing unit 37, and transmits the data to the acceleration/deceleration processing unit 39. The acceleration/deceleration processing unit 39 performs an acceleration/deceleration process for smoothly changing the acceleration on a result of an interpolation process supplied from the interpolation processing unit 38. The acceleration/deceleration processing unit 39 transmits speed commands each of which is a processing result of the acceleration/deceleration process to the axis data input/output unit 40. The axis data input/output unit 40 outputs the speed commands to the drive unit 90. Specifically, the axis data input/output unit 40 outputs, to the drive unit 90, a speed command to the X axis, a speed command to the Z axis, and a rotational speed command to each spindle. For each spindle, a step command is output from the axis data input/output unit 40 to the drive unit 90 without performing the acceleration/deceleration process.

The interference processing unit 381 includes an interference definition unit 85, a coordinate management unit 80, and an interference check processing unit 382.

The interference definition unit 85 acquires the interference definition data 3412 from the parameter storage area 341. The interference definition data 3412 includes interference definition data related to an interference definition area 100A obtained by modeling a mechanism including fixed portions and movable portions of the machine tool 100, and interference definition data related to an interference definition area 60A obtained by modeling movable portions including the robot arm 21 of the robot 60. The interference definition area 100A corresponds to a first interference definition area, and the interference definition area 60A corresponds to a second interference definition area. The movable portions of the machine tool 100 are moving portions in the machine tool 100, and include, for example, the tool holders 11a and 11b, the chuck mechanisms 12a and 12b, and the workpieces to be machined 5a and 5b.

When the machine origin of the robot 60 moves due to the movement of the pedestal 23 of the robot 60, the coordinate management unit 80 updates the machine origin offset data 3411. In addition, when the machine origin of the machine tool 100 moves due to the operation of the machine tool 100, the coordinate management unit 80 updates the machine origin offset data 3411. On the display unit 4 illustrated in FIG. 1, "#5001 Machine origin offset" is displayed as an example of parameter display related to the machine origin offset data 3411, and the machine origin offset is calculated as needed from a position command or a feedback position of a servomotor.

The interference check processing unit 382 acquires the interference definition data 3412 from the interference definition unit 85, acquires position command data or position feedback data for an operation of the robot from the robot control unit 41, acquires position command data or position feedback data for the movement of each axis of the machine tool 100 from the interpolation processing unit 38, and acquires the updated machine origin offset data 3411 from the coordinate management unit 80. The interference check processing unit 382 calculates a current position of the interference definition area 100A on the basis of acquired position data of each axis of the machine tool 100 and interference definition data (first interference definition data) related to the interference definition area 100A of the machine tool 100. The interference check processing unit 382 calculates a current position of the interference definition area 60A on the basis of position data of each axis of the robot 60 and interference definition data (second interference definition data) related to the interference definition area 60A of the robot 60. Then, on the basis of the current position of the interference definition area 100A of the machine tool 100, the interference definition area 60A of the robot 60, and the machine origin offset data 3411 at the time of acquisition, the interference check processing unit 382 checks whether an overlap between the interference definition area 100A of the machine tool 100 and the interference definition area 60A of the robot 60 is prevented. If the interference check processing unit 382 determines that there is interference as a result of the check, the interference check processing unit 382 notifies the interpolation processing unit 38 and the robot control unit 41 of the occurrence of mechanical interference, and stops the operation of the machine tool 100, the movement operation of the pedestal 23 of the robot 60, and the operation of the robot 60.

Figure 4:
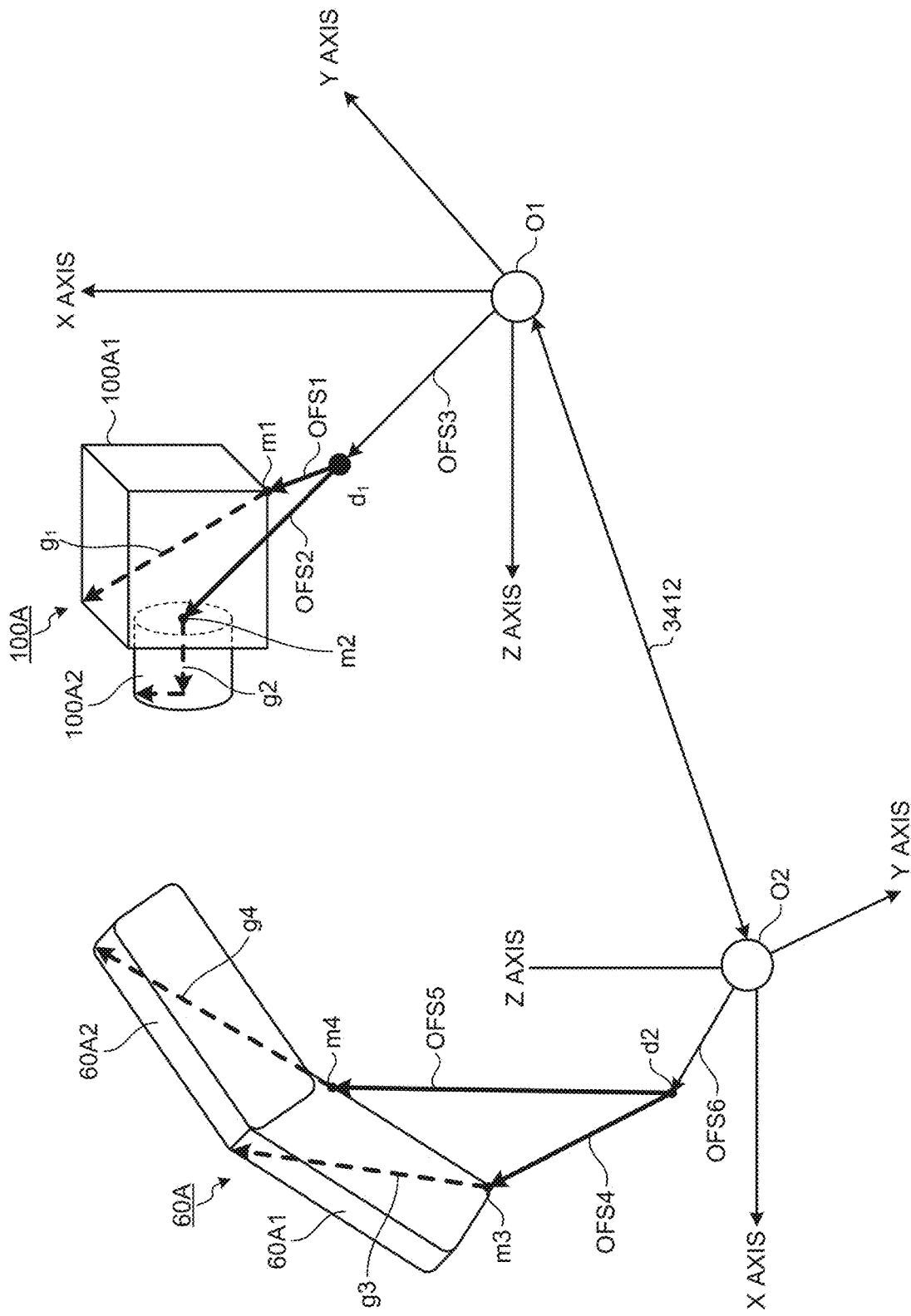
FIG. 4 is a diagram conceptually illustrating an interference definition area of the machine tool and an interference definition area of the robot according to the first embodiment.

FIG. 4 is a diagram conceptually illustrating the interference definition area 100A of the machine tool 100 and the interference definition area 60A of the robot 60. The interference definition area 100A of the machine tool 100 is obtained by modeling fixed portions and movable portions of the machine tool 100 for interference detection. In FIG. 4, the interference definition area 100A is defined by a first group of interference models including a cuboid model 100A1 and a cylindrical model 100A2. In the machine tool 100 of FIG. 1, since two tool holders 11a and 11b, two chuck mechanisms 12a and 12b, and two workpieces to be machined 5a and 5b are included as movable portions, it is necessary to define pluralities of groups of interference models. However, in the interference definition area 100A of FIG. 4, only one group of interference models is illustrated for convenience. The interference definition area 100A is defined by a plurality of parameters including a structural three-dimensional offset OFS1 which is an offset of an origin m1 of the cuboid model 100A1 with respect to a coordinate origin d1 which is a coordinate origin of a first group of interference models, a structural three-dimensional offset OFS2 which is an offset of an origin m2 of the cylindrical model 100A2 with respect to the coordinate origin d1, an interference model coordinate system offset OFS3 which is an offset of the coordinate origin d1 with respect to a machine origin O1, and dimensional data g1 and g2 of respective models 100A1 and 100A2. The machine origin O1 is a machine origin of the machine tool 100 and corresponds to a first machine origin. As described above, the interference definition area 100A of the machine tool 100 is defined by a first coordinate system. The first coordinate system is a coordinate system with the machine origin O1 as an origin, and is a coordinate system represented by an X axis, a Y axis, and a Z axis in FIG. 4. The plurality of parameters defining the interference definition area 100A are stored in the parameter storage area 341 as the interference definition data 3412.

The interference definition area 60A of the robot 60 is obtained by modeling the movable portions of the robot 60. However, the movable portions of the robot 60 to be modeled do not include the rotational movement conversion mechanism 503 which is a movement mechanism of the pedestal 23. The robot hand is generally included in the interference definition area 60A of the robot 60, but may not be included depending on, for example, an input from outside such as a PLC. In FIG. 4, the interference definition area 60A is defined by two cuboid models 60A1 and 60A2. The interference definition area 60A is defined by a plurality of parameters including a structural three-dimensional offset OFS4 which is an offset of an origin m3 of the cuboid model 60A1 with respect to a coordinate origin d2 which is a coordinate origin of interference models of the robot 60 including the cuboid models 60A1 and 60A2, a structural three-dimensional offset OFS5 which is an offset of an origin m4 of the cuboid model 60A2 with respect to the coordinate origin d2, an interference model coordinate system offset OFS6 which is an offset of the coordinate origin d2 with respect to a machine origin O2, and dimensional data g3 and g4 of respective models 60A1 and 60A2. The machine origin O2 is a machine origin of the robot 60 and corresponds to a second machine origin. As described above, the interference definition area 60A of the robot 60 is defined by a second coordinate system based on the machine origin O2 of the robot 60. The plurality of parameters defining the interference definition area 60A are stored in the parameter storage area 341 as the interference definition data 3412.

In FIG. 4, the interference definition areas 100A and 60A are defined by a cuboid and a cylinder, but may be defined by other shapes. The interference definition areas may be modeled from computer-aided design (CAD) data to define coordinates serving as reference. The plurality of parameters defining the interference definition areas 100A and 60A may not be stored in the parameter storage area 341 but be defined by data setting from the PLC 36. In that case, the data is read from the control signal processing unit 35 and is read by the interference definition unit 85 via the shared area 345 of the storage unit 34.

As illustrated in FIG. 4, the machine origin O1 of the machine tool 100 and the machine origin O2 of the robot 60 are associated with each other by the machine origin offset data 3411. The machine origin offset data 3411 is a parameter indicating a positional relationship between the machine origin O1 of the machine tool 100 and the machine origin O2 of the robot 60. When the pedestal 23 of the robot 60 is moved by the servomotor 501, the machine origin offset data 3411 is updated by the coordinate management unit 80 after every movement. The plurality of first axes are X, Y, and Z axes with the machine origin O1 as an origin, and position data of the plurality of first axes are position data in an X, Y, and Z coordinate system with the machine origin O1 as an origin.

Figure 5:
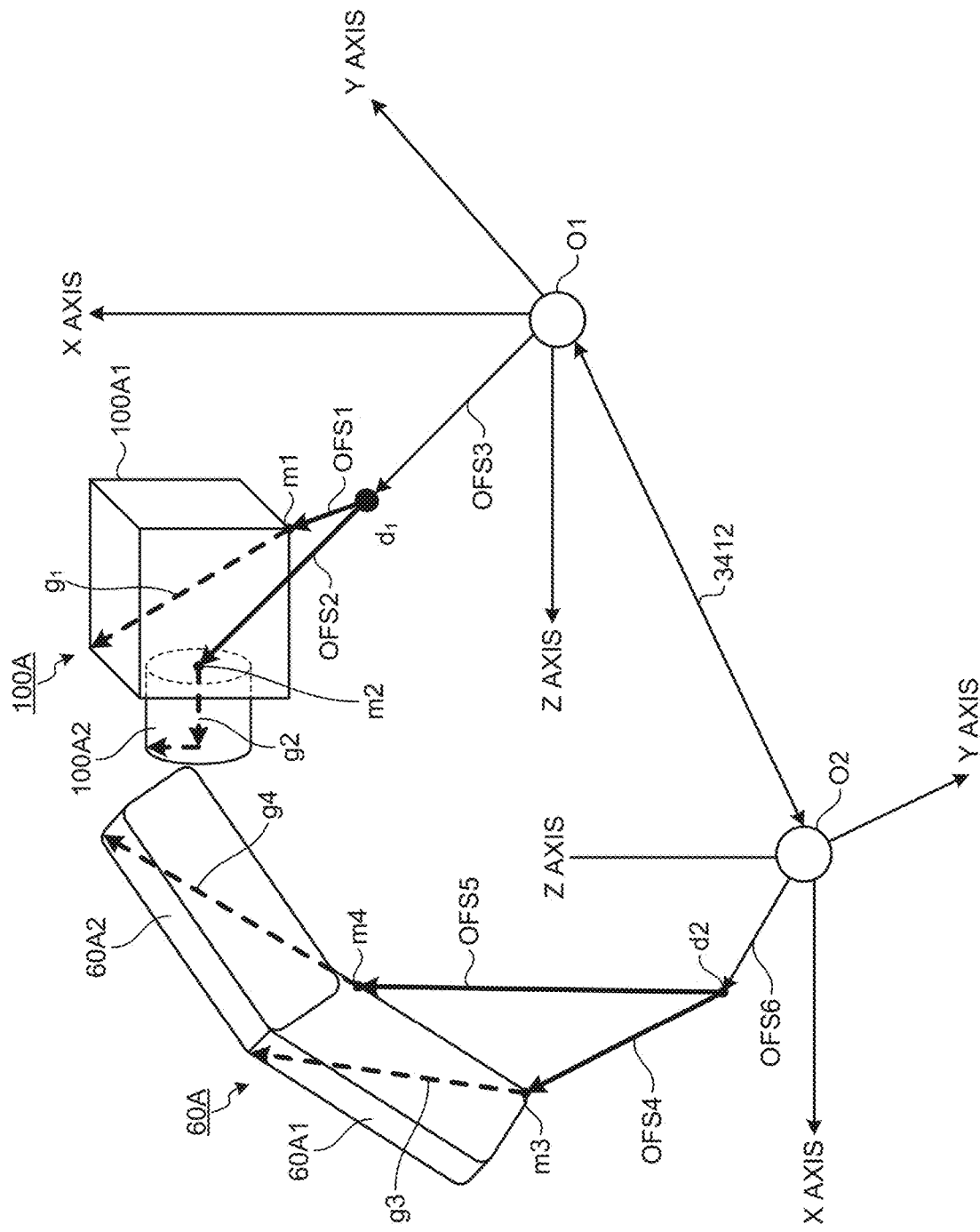
FIG. 5 is a diagram conceptually illustrating a positional relationship between the interference definition area of the machine tool and the interference definition area of the robot when machine origin offset data is updated.

FIG. 5 is a diagram conceptually illustrating a positional relationship between the interference definition area 100A of the machine tool 100 and the interference definition area 60A of the robot 60 when the machine origin offset data 3411 is updated. FIG. 5 illustrates a state immediately before a movable portion of the machine tool 100 and the robot arm 21 interfere with each other. As illustrated therein, even when the machine origin offset data 3411 is updated, the robot 60 approaches the machine tool 100, and the movable portion of the machine tool 100 and the robot arm 21 are not operating, mechanical interference may be caused between the movable portion of the machine tool 100 and the robot arm 21 due to the movement of the pedestal 23 of the robot 60. In the first embodiment, such mechanical interference is prevented in advance. In addition, also when the movable portion of the machine tool 100 and the robot 60 are operating, mechanical interference can be similarly prevented. If feedback position data of the movable portion of the machine tool 100 and that of the robot arm 21 are acquired and the machine origin offset data 3411 is updated with feedback position data of the servomotor 501, not only a mechanical interference check during automatic operation but also a mechanical interference check during manual operation can be performed.

Figure 6:
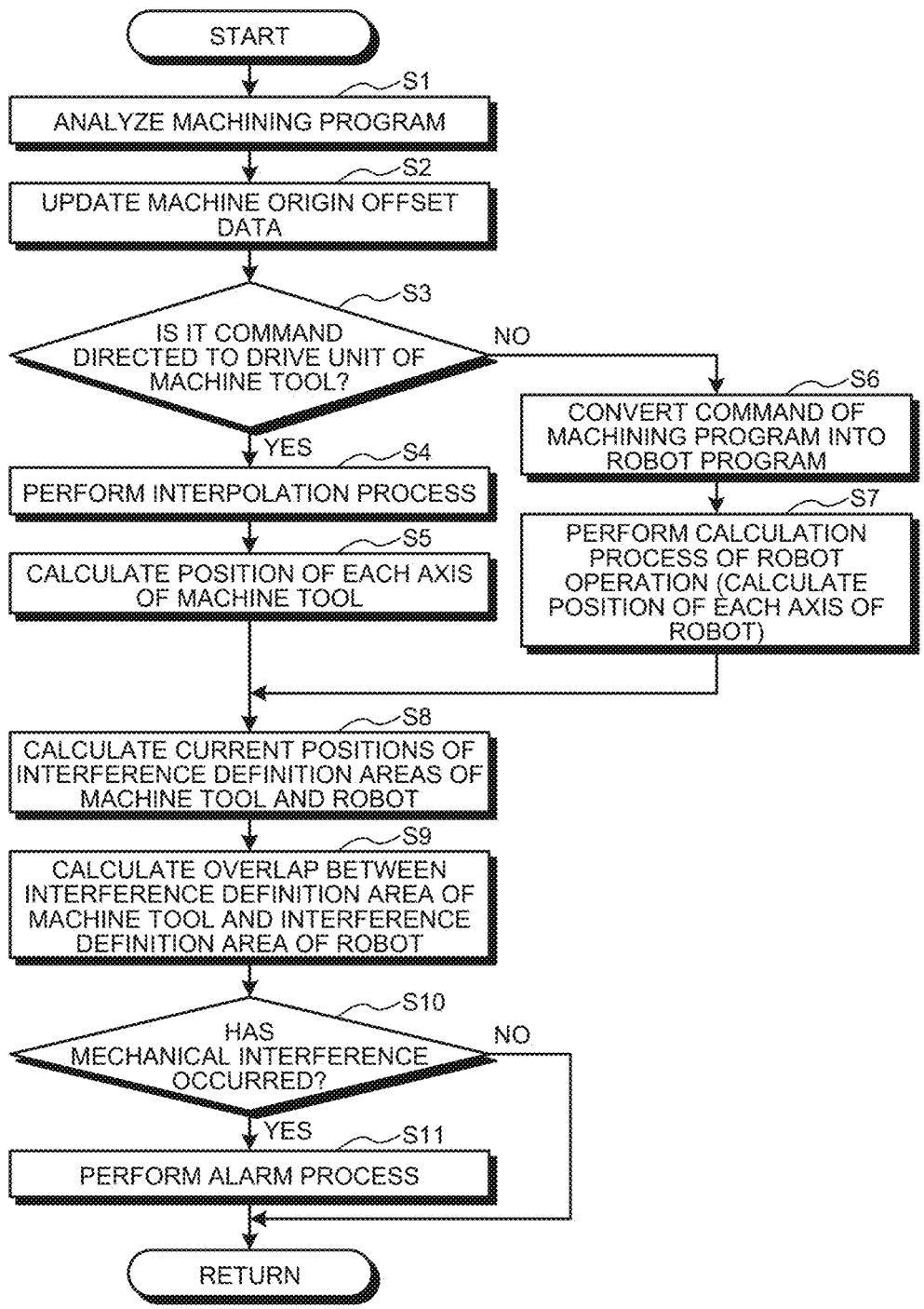
FIG. 6 is a flowchart illustrating operation procedures of a control calculation unit of the numerical controller of the first embodiment.

An operation of the control calculation unit 2X will be described with reference to the flowchart of FIG. 6. FIG. 6 is a flowchart illustrating operation procedures of the control calculation unit 2X of the numerical controller 1X. The processes in FIG. 6 are performed during a read-ahead process of the numerical controller 1X. The analysis processing unit 37 analyzes a machining program stored in the NC program storage area 343, that is, a command to the drive unit 90. The analysis processing unit 37 also analyzes a robot pedestal movement command which is a command to move the pedestal 23 of the robot 60. The robot command analysis unit 371 of the analysis processing unit 37 analyzes a machining program for operating the robot 60 (step S1).

Since the machine origin O2 of the robot 60 changes due to the movement of the pedestal 23, the coordinate management unit 80 acquires a feedback position of the servomotor 501 of the pedestal 23 of the robot 60 via the pedestal servo control unit 500, the axis data input/output unit 40, the acceleration/deceleration processing unit 39, and the interpolation processing unit 38, and calculates the machine origin O2 of the robot 60 on the basis of the acquired position of the pedestal 23. The coordinate management unit 80 calculates the machine origin offset data 3411 on the basis of the calculated machine origin O2 of the robot 60 and the machine origin O1 of the machine tool 100, and writes the calculated machine origin offset data 3411 in the parameter storage area 341 (step S2). That is, the coordinate management unit 80 updates the machine origin offset data 3411 as the pedestal 23 of the robot 60 moves.

The analysis processing unit 37 determines whether the analyzed command is a command to be output to the drive unit 90 of the machine tool 100 or a command directed to the robot 60 (step S3). If it is the command directed to the drive unit 90 of the machine tool 100 (step S3: Yes), the analysis processing unit 37 outputs the analyzed command to the interpolation processing unit 38. If it is the command directed to the robot 60 (step S3: No), the analysis processing unit 37 outputs the analyzed command to the robot control unit 41.

The interpolation processing unit 38 performs an interpolation process on the basis of the command input from the analysis processing unit 37, and calculates position data of each axis of the drive unit 90 (step S4). The acceleration/deceleration processing unit 39 performs an acceleration/deceleration process on the position data supplied from the interpolation processing unit 38, and transmits a speed command which is a processing result of the acceleration/deceleration process to the axis data input/output unit 40. The axis data input/output unit 40 outputs the speed command (position command per unit time) to the drive unit 90 (step S5).

The robot control unit 41 converts the command of the machining program input from the analysis processing unit 37 into a robot program (step S6). The robot control unit 41 calculates a robot operation on the basis of the converted robot program, and calculates position data of each axis of the robot 60 (step S7). Specifically, the robot control unit 41 calculates the position of the robot arm 21, the position of the robot hand 22, and the like. The robot control unit 41 outputs the calculated position data to the robot controller 50X.

In step S3, the analysis processing unit 37 transmits a command directed to the machine tool 100 in the machining program to the interpolation processing unit 38, and transmits a command directed to the robot 60 to the robot control unit 41, so that the processes in steps S4 and S5 and the processes in steps S6 and S7 are performed in parallel.

The interference check processing unit 382 acquires the interference definition data 3412 related to the interference definition area 100A in an initial state of the machine tool 100 and the interference definition data 3412 related to the interference definition area 60A in an initial state of the robot 60 from the parameter storage area 341 via the interference definition unit 85. In addition, the interference check processing unit 382 acquires position feedback data of the movable portions of the machine tool 100 from the interpolation processing unit 38, and acquires position feedback data of the movable portions such as the robot arm 21 from the robot control unit 41. The interference check processing unit 382 calculates a current position of the interference definition area 100A of the machine tool 100 on the basis of the interference definition data 3412 related to the interference definition area 100A in the initial state of the machine tool 100 acquired from the parameter storage area 341 and the position feedback data of the movable portions of the machine tool 100. In addition, the interference check processing unit 382 calculates a current position and attitude of the interference definition area 60A of the robot 60 on the basis of the interference definition data 3412 related to the interference definition area 60A in the initial state of the robot 60 acquired from the parameter storage area 341 and the position feedback data of the movable portions such as the robot arm 21 (step S8). Interference definition data related to an interference definition area A of each fixed portion of the machine tool 100 is calculated before the interference check processing unit 382 starts operation by the machining program, and stored in the parameter storage area 341. The interference check processing unit 382 acquires the interference definition data related to the interference definition area A of each fixed portion of the machine tool 100 from the parameter storage area 341.

On the basis of the acquired current position of the interference definition area 100A of the machine tool 100, the acquired current position of the interference definition area 60A of the robot 60, and the machine origin offset data 3411 updated in step S2, the interference check processing unit 382 calculates an overlap between the interference definition area 100A of the machine tool 100 and the interference definition area 60A of the robot 60 (step S9). Since the overlap between the interference definition area 100A of the machine tool 100 and the interference definition area 60A of the robot 60 is calculated on the basis of the updated machine origin offset data 3411, the interference between the machine tool 100 and the robot 60 can be checked even in a case where the pedestal 23 of the robot 60 moves.

If the interference check processing unit 382 detects that the mechanical interference has occurred (step S10: Yes), the process proceeds to step S11. If no mechanical interference has been detected (step S10: No), the interference check processing unit 382 returns the process.

In step S11, the interference check processing unit 382 transmits an operation stop signal to the interpolation processing unit 38 and the robot control unit 41, and at the same time, displays an alarm on the display unit 4 via the screen processing unit 31. When receiving the operation stop signal from the interference check processing unit 382, the interpolation processing unit 38 and the robot control unit 41 stop the calculation. As a result, the movable portions of the machine tool 100, the movable portions of the robot 60, and the pedestal 23 of the robot 60 stop moving. The series of processes described above is performed during the read-ahead process of the numerical controller 1X, and in a case where mechanical interference is detected, the calculation is stopped, so that there occurs no mechanical interference between the machine tool 100 and the robot 60.

As described above, in the first embodiment, the machine origin offset data 3411 indicating the positional relationship between the machine tool 100 and the robot 60 is updated as the pedestal 23 moves, and the numerical controller 1X itself that controls the machine tool 100 and the robot 60 detects mechanical interference between the machine tool 100 and the robot 60 on the basis of the updated machine origin offset data 3411. Therefore, even in a case where the pedestal 23 of the robot 60 moves, interference between the machine tool 100 and the robot 60 can be avoided. In the first embodiment, it is assumed that the robot 60 moves as the pedestal 23 moves, but in short, if the machine origin O1 of the machine tool 100 and the machine origin O2 of the robot 60 are relatively movable, an effect similar to that of the present embodiment is achieved.

Second Embodiment

Figure 7:
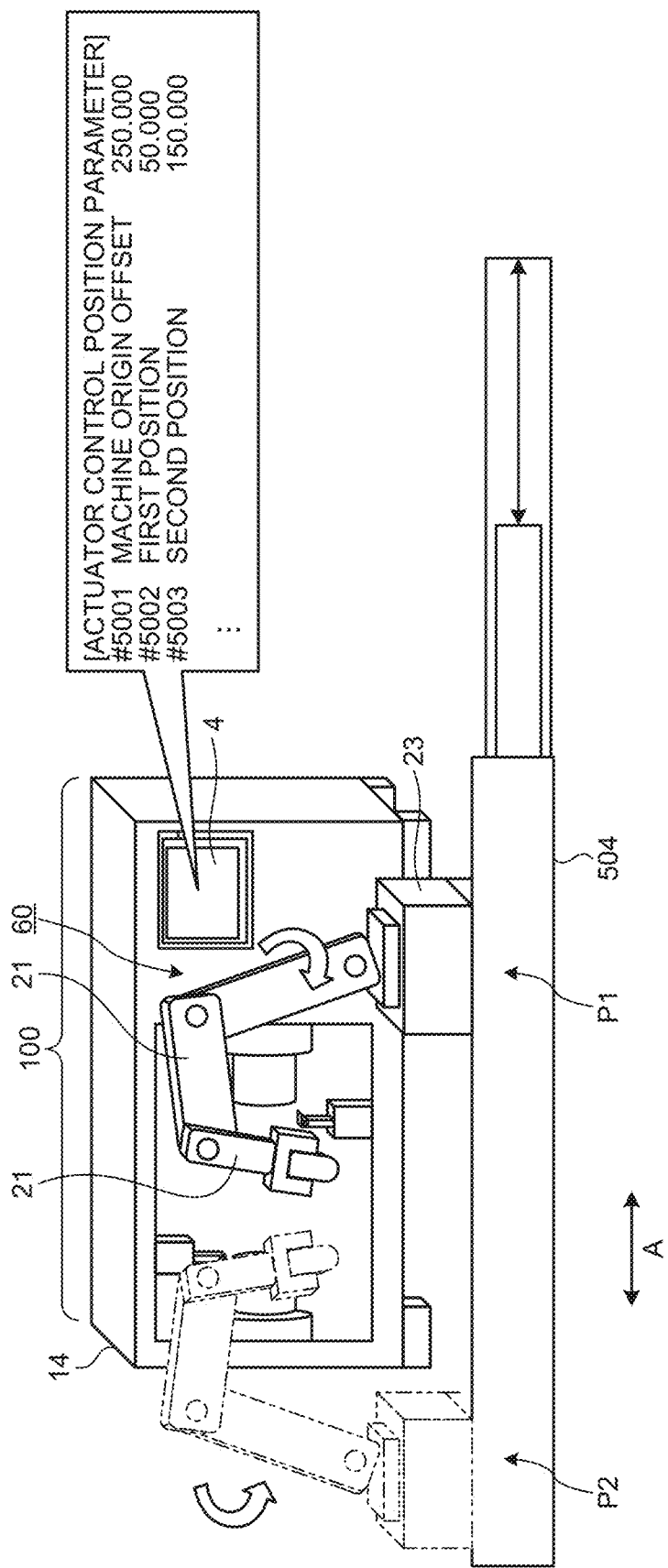
Figure 8:
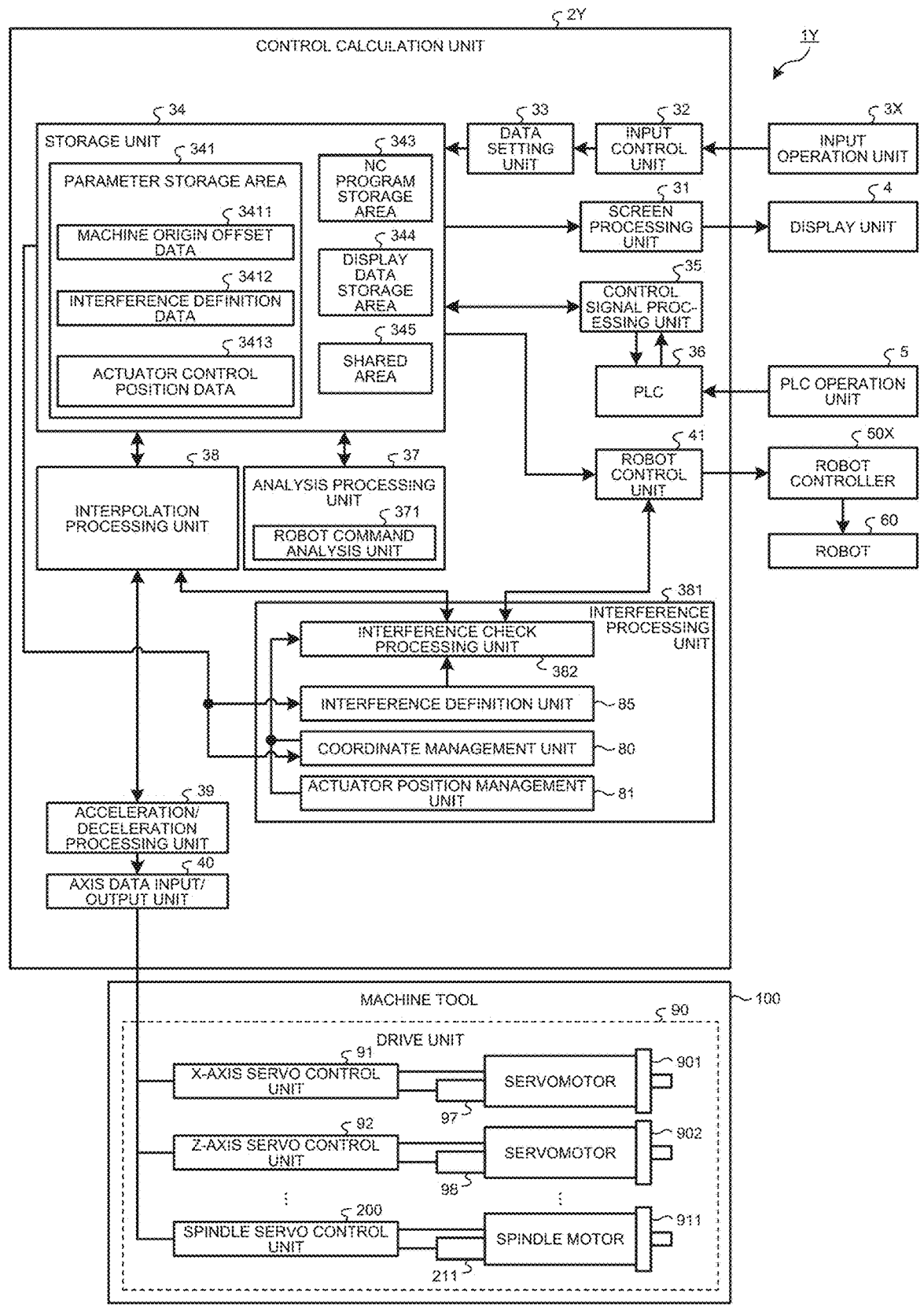
FIG. 8 is a block diagram illustrating an example configuration of a numerical controller of the second embodiment.
Figure 9:
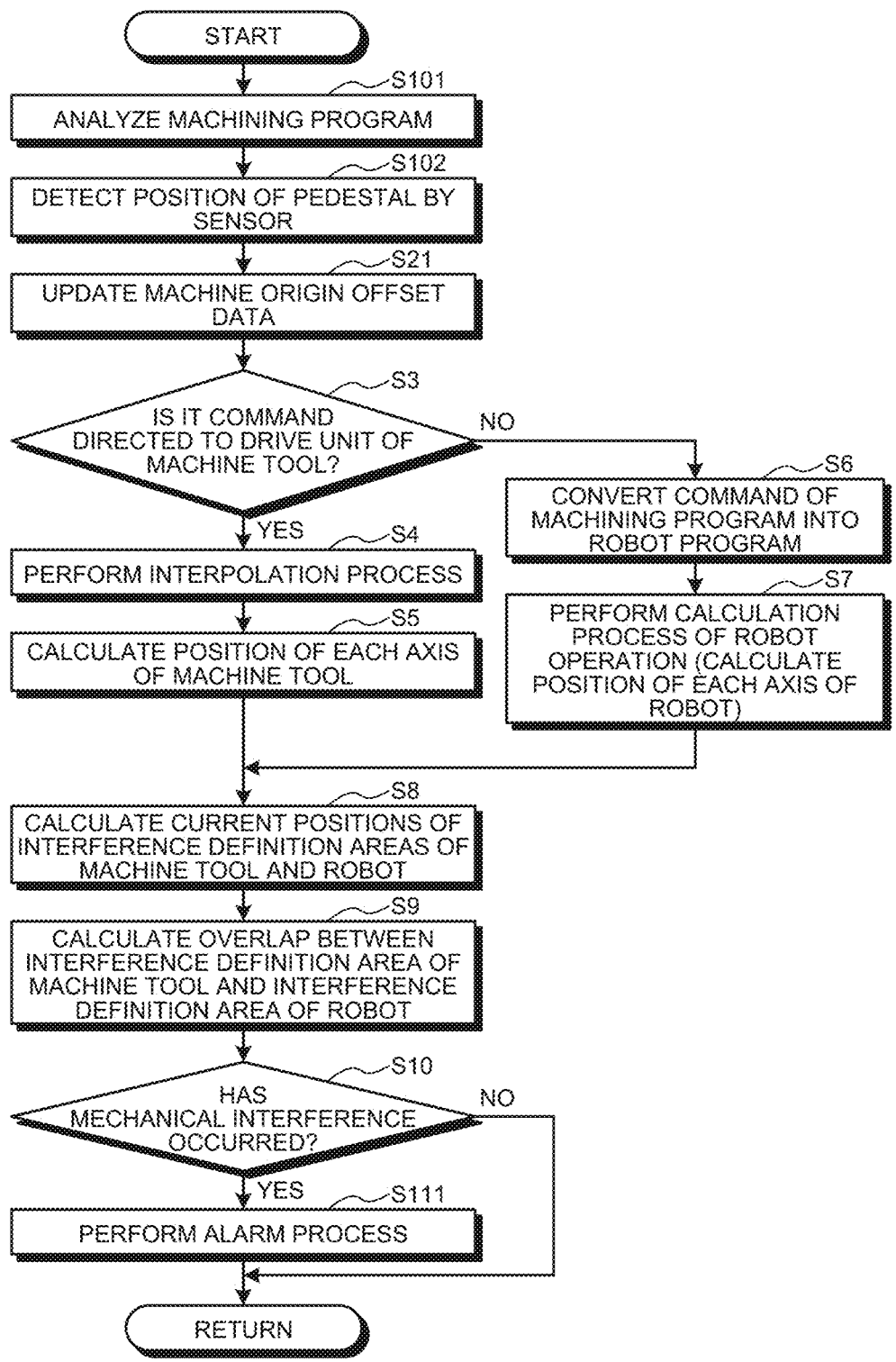
FIG. 9 is a flowchart illustrating operation procedures of a control calculation unit of the numerical controller of the second embodiment.

A numerical controller 1Y of a second embodiment will be described with reference to FIGS. 7 to 9. FIG. 7 is a view illustrating a movement mechanism of the pedestal 23 of the robot 60 of the second embodiment, and the like. FIG. 8 is a block diagram illustrating an example configuration of the numerical controller 1Y of the second embodiment. FIG. 9 is a flowchart illustrating operation procedures of a control calculation unit 2Y of the numerical controller 1Y.

As illustrated in FIG. 7, in the second embodiment, the pedestal 23 of the robot 60 is moved by an actuator 504. In FIG. 7, the pedestal 23 of the robot 60 reciprocates in the arrow A direction between a first position P1 and a second position P2 by the operation of the actuator 504. The actuator 504 drives the pedestal 23 by, for example, hydraulic pressure. The movement to the first position P1 or the movement to the second position P2 is directed by M code of the machining program. The actuator 504 includes a sensor such as a limit switch (not illustrated) that detects completion of movement of the pedestal 23 to the first position P1 and completion of movement of the pedestal 23 to the second position P2. When detecting that the pedestal 23 has moved to the first position P1 by the operation of the actuator 504, the sensor such as a limit switch notifies the PLC 36 of a position detection signal. When detecting that the pedestal 23 has moved to the second position P2 by the operation of the actuator 504, the sensor such as a limit switch notifies the PLC 36 of a position detection signal.

In the control calculation unit 2Y of the numerical controller 1Y of FIG. 8, actuator control position data 3413 and an actuator position management unit 81 are added as compared with the control calculation unit 2X of the first embodiment. In addition, the pedestal servo control unit 500, the servomotor 501, and the detector 502 are removed. Regarding components among components in FIG. 8 that achieve the same functions as those of the numerical controller 1X of the first embodiment illustrated in FIG. 3, the same reference signs are assigned thereto, and repetitive descriptions thereof will be omitted.

The parameter storage area 341 further includes the actuator control position data 3413. The interference processing unit 381 further includes the actuator position management unit 81. The actuator control position data 3413 is a parameter for setting a positioning position of the actuator 504 when the pedestal 23 of the robot 60 is moved by the actuator 504. For example, as displayed on the display unit 4 in FIG. 7, setting is performed as follows.

| #5001 | machine origin offset | 250.000 |
| #5002 | first position | 50.000 |
| #5003 | second position | 150.000 |

Here, for #5001 machine origin offset, for example, an offset at the first position is set.

When receiving a notification indicating completion of movement to the first position P1 from the PLC 36 via the control signal processing unit 35, the actuator position management unit 81 acquires data of the first position P1 included in the actuator control position data 3413 from the parameter storage area 341, and passes the data to the coordinate management unit 80. When receiving a notification indicating completion of movement to the second position P2 from the PLC 36 via the control signal processing unit 35, the actuator position management unit 81 acquires data of the second position P2 included in the actuator control position data 3413 from the parameter storage area 341, and passes the data to the coordinate management unit 80. As described above, the notification indicating completion of movement to the first position P1 and the notification indicating completion of movement to the second position P2 are based on the position detection signals from the limit switch or the like.

Next, an operation of the control calculation unit 2Y will be described with reference to the flowchart of FIG. 9. In FIG. 9, S1 and S2 in FIG. 6 are replaced with S101, S102, and S21, and S11 in FIG. 6 is replaced with S111. Other processes are similar to those in FIG. 6, and repetitive descriptions thereof will be omitted. In step S101, the analysis processing unit 37 analyzes a machining program stored in the NC program storage area 343, that is, a command to the drive unit 90. The analysis processing unit 37 also analyzes an actuator movement command (M code) for moving the pedestal 23 of the robot 60. The robot command analysis unit 371 of the analysis processing unit 37 analyzes a machining program for operating the robot 60.

In step S102, the position of the pedestal 23 is detected by the sensor such as a limit switch. When detecting that the pedestal 23 has moved to the first position P1 by the operation of the actuator 504, the sensor outputs a position detection signal (notification indicating completion of movement) to the PLC 36. When receiving a notification indicating completion of movement of the actuator 504 to the first position P1 from the control signal processing unit 35, the actuator position management unit 81 acquires data of the first position P1 included in the actuator control position data 3413 from the parameter storage area 341, and passes the data to the coordinate management unit 80. Data of the second position P2 is similarly detected.

In step S21, the coordinate management unit 80 acquires the data of the first position P1 or the data of the second position P2 from the actuator position management unit 81, calculates the machine origin O2 of the robot 60, calculates the machine origin offset data 3411 on the basis of the calculated machine origin O2 of the robot 60 and the machine origin O1 of the machine tool, and writes the calculated machine origin offset data 3411 in the parameter storage area 341. That is, the coordinate management unit 80 updates the machine origin offset data 3411 when the pedestal 23 of the robot 60 moves to the first position P1 or the second position P2.

Thereafter, in steps S3 to S10, processes similar to those in FIG. 6 are performed. In step S111, the interference check processing unit 382 transmits an operation stop signal to the interpolation processing unit 38 and the robot control unit 41, and at the same time, displays an alarm on the display unit 4 via the screen processing unit 31. As a result, the movable portions of the machine tool 100 and the movable portions of the robot 60 stop moving. In the second embodiment, since the operation of the actuator 504 is stopped and the pedestal 23 is also stopped at this stage, the interference check processing unit 382 does not bother to stop the operation of the actuator 504 in step S111.

As described above, also in the second embodiment, the machine origin offset data 3411 indicating the positional relationship between the machine tool 100 and the robot 60 is updated as the pedestal 23 moves, and the numerical controller 1Y itself that controls the machine tool 100 and the robot 60 detects mechanical interference between the machine tool 100 and the robot 60 on the basis of the updated machine origin offset data 3411. Therefore, even in a case where the pedestal 23 of the robot 60 moves, interference between the machine tool 100 and the robot 60 can be avoided.

Third Embodiment

Figure 10:
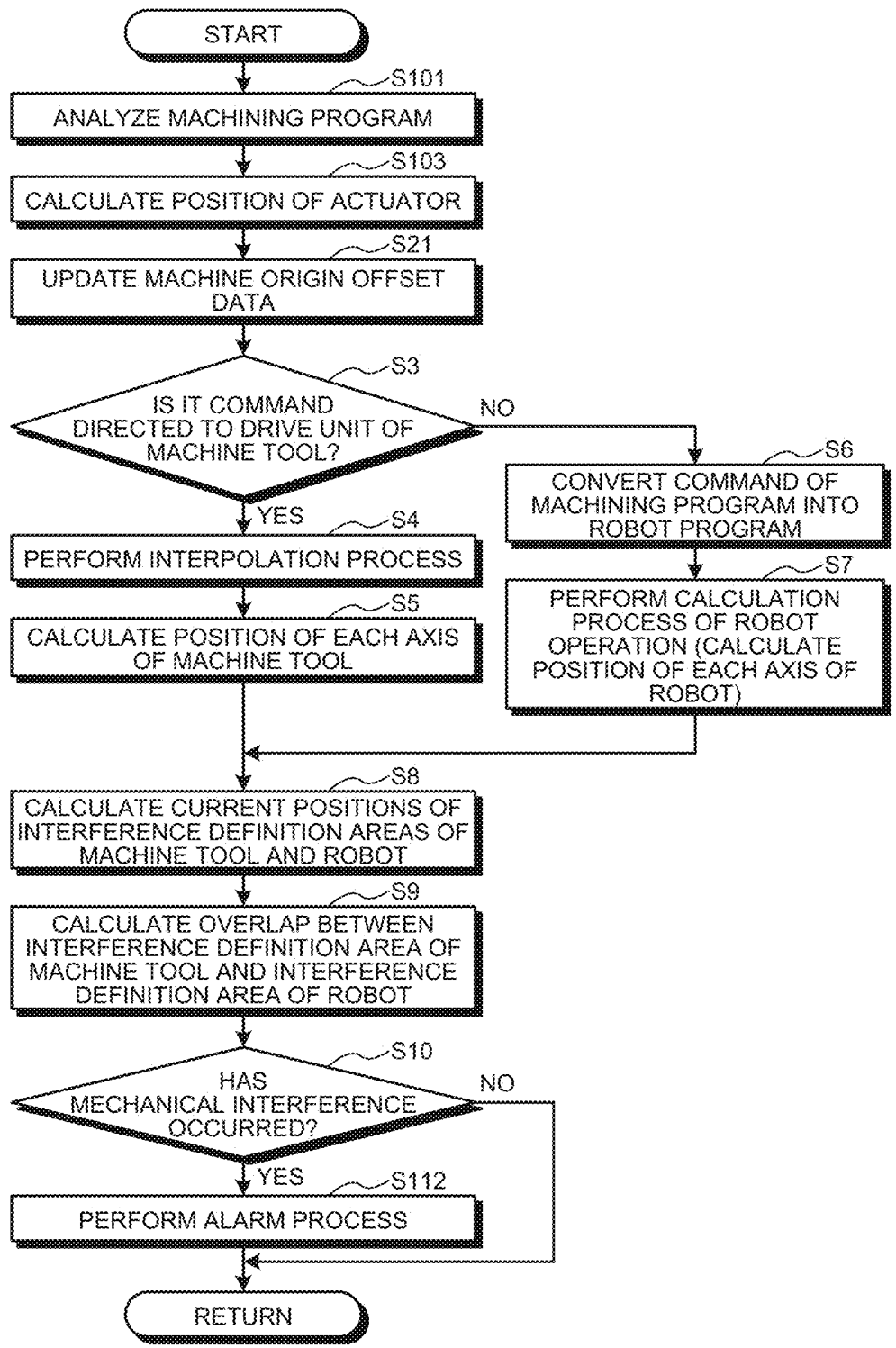
FIG. 10 is a flowchart illustrating operation procedures of the control calculation unit of the numerical controller of a third embodiment.

The numerical controller 1Y of a third embodiment will be described with reference to FIGS. 7, 8, and 10. FIG. 10 is a flowchart illustrating operation procedures of the control calculation unit 2Y of the numerical controller 1Y of the third embodiment. In the second embodiment, the position of the actuator 504 is detected only at the first position P1 and the second position P2, but in the third embodiment, the position of the actuator 504 that is moving is successively detected.

An operation of the control calculation unit 2Y will be described with reference to the flowchart of FIG. 10. In FIG. 10, S102 and S111 in FIG. 9 are respectively replaced with S103 and S112. Other processes are similar to those in FIG. 6, and repetitive descriptions thereof will be omitted. Similarly to the second embodiment, in step S101, the analysis processing unit 37 analyzes a machining program stored in the NC program storage area 343, that is, a command to the drive unit 90. The analysis processing unit 37 also analyzes an actuator movement command (M code) for moving the pedestal 23 of the robot 60. The robot command analysis unit 371 of the analysis processing unit 37 analyzes a machining program for operating the robot 60.

In step S103, when receiving a notification of start-up (start of operation) of the actuator 504 from the control signal processing unit 35, the actuator position management unit 81 successively calculates the position of the moving actuator 504, that is, the position of the pedestal 23.

In a case where the actuator 504 is a hydraulic-type actuator, the position of the moving actuator 504 is calculated on the basis of the following formulas, for example. When a flow rate is denoted by Q, a tube diameter is denoted by D, and a rod diameter is denoted by d, an extension speed Vn and a retraction speed Vc of the actuator 504 are expressed as follows.

$$Vn=(Q/(\pi/4\times D^2))\times 10^3$$

$$Vc=(Q/(\pi/4\times(D^2-d^2)))\times 10^3$$

Therefore, when an elapsed time from the start of the operation of the actuator 504 in an extension direction is denoted by t1 and an elapsed time from the start of the operation of the actuator 504 in a retraction direction is denoted by t2, an actuator position Pf at a time of extension and an actuator position Pb at a time of retraction are expressed as follows.

$$Pf=Vn\times t1$$

$$Pb=Vc\times t2$$

The coordinate management unit 80 acquires position data of the actuator 504, that is, the position of the pedestal 23 from the actuator position management unit 81. The coordinate management unit 80 calculates the machine origin O2 of the robot 60 on the basis of the acquired position of the pedestal 23. The coordinate management unit 80 calculates the machine origin offset data 3411 on the basis of the calculated machine origin O2 of the robot 60 (actuator position calculated by the actuator position management unit 81) and the machine origin O1 of the machine tool, and writes the calculated machine origin offset data 3411 in the parameter storage area 341. That is, the coordinate management unit 80 successively updates the machine origin offset data 3411 as the pedestal 23 of the robot 60 moves.

Thereafter, in steps S3 to S10, processes similar to those in FIG. 6 are performed. In step S112, the interference check processing unit 382 transmits an operation stop signal to the interpolation processing unit 38, the robot control unit 41, and the actuator 504, and at the same time, displays an alarm on the display unit 4 via the screen processing unit 31. As a result, the movable portions of the machine tool 100, the movable portions of the robot 60, and the pedestal 23 of the robot 60 stop moving. The interference check processing unit 382 transmits a notification of stop of the actuator to the control signal processing unit 35, and thereby the actuator 504 is stopped. At that time, the control signal processing unit 35 transmits an actuator stop signal to the PLC 36, and the PLC 36 stops the actuator 504.

As described above, also in the third embodiment, the machine origin offset data 3411 indicating the positional relationship between the machine tool 100 and the robot 60 is updated as the pedestal 23 moves, and the numerical controller 1Y itself that controls the machine tool 100 and the robot 60 detects mechanical interference between the machine tool 100 and the robot 60 on the basis of the updated machine origin offset data 3411. Therefore, even in a case where the pedestal 23 of the robot 60 moves, interference between the machine tool 100 and the robot 60 can be avoided.

Fourth Embodiment

Figure 11:
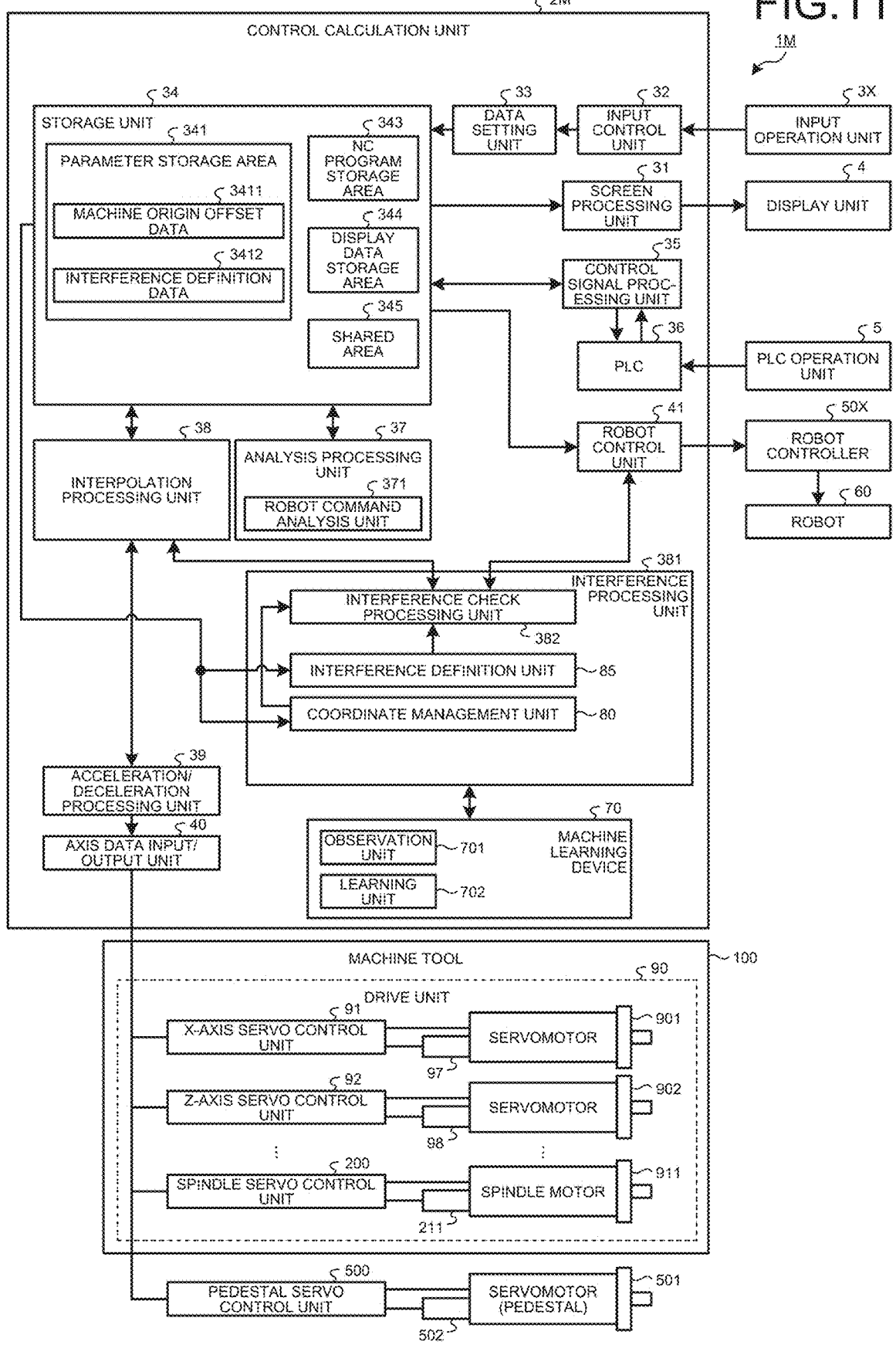
FIG. 11 is a block diagram illustrating an example configuration of a numerical controller according to a fourth embodiment.

A numerical controller 1M of a fourth embodiment will be described with reference to FIG. 11. FIG. 11 is a block diagram illustrating an example configuration of the numerical controller 1M according to the fourth embodiment. A control calculation unit 2M of the numerical controller 1M in FIG. 11 is obtained by adding a machine learning device 70 to the numerical controller 1X illustrated in FIG. 3. Regarding components among components in FIG. 11 that achieve the same functions as those of the numerical controller 1X illustrated in FIG. 3, the same reference signs are assigned thereto, and repetitive descriptions thereof will be omitted.

The machine learning device 70 includes an observation unit 701 and a learning unit 702. The machine learning device 70 learns mechanical interference between the machine tool 100 and the robot 60 by using interference information (r) and machining program information during interference (r) to infer interference alarm prior information (n) for notifying the interference check processing unit 382 of occurrence of interference in advance. The interference information (r) is input from the interference check processing unit 382 to the observation unit 701. The interference information (r) includes interference definition data related to the interference definition area 100A of the machine tool 100 when mechanical interference occurs and interference definition data related to the interference definition area 60A of the robot 60 when mechanical interference occurs. The machining program information during interference (r) is input from the analysis processing unit 37 to the observation unit 701. The machining program information during interference (r) includes machining program information during interference analyzed by the analysis processing unit 37. The machining program information during interference (r) will be simply referred to as machining program information (r).

The observation unit 701 performs data observation of the interference information (r) and the machining program information (r). The observation unit 701 outputs state information (i) which is a result of the data observation to the learning unit 702. The state information (i) is a dataset in which the interference alarm information (r) and the machining program information during interference (r) are associated with each other.

The learning unit 702 acquires the state information (i) from the observation unit 701. The learning unit 702 learns the state information (i) output from the observation unit 701 and outputs, to the interference check processing unit 382, the interference alarm prior information (n), which is information in which presence or absence of interference is inferred.

The machine learning device 70 is not limited to one provided in the numerical controller 1M. The machine learning device 70 may be provided outside the numerical controller 1M. The machine learning device 70 may be provided in a device connectable to the numerical controller 1M via a network. That is, the machine learning device 70 may be a separate component connected to the numerical controller 1M via a network. The machine learning device 70 may exist on a cloud server.

The learning unit 702 learns features from the state information (i) in which the interference information (r) and the machining program information (r) are associated with each other by so-called supervised learning in accordance with a neural network model, for example. Here, supervised learning is a model in which a large number of sets of data each including a certain input and a result are given to a learning device, and thereby features reside in the datasets are learned and results are estimated from inputs.

A neural network includes an input layer including a plurality of neurons, an intermediate layer (hidden layer) including a plurality of neurons, and an output layer including a plurality of neurons. The intermediate layer may be one layer, or may be two or more layers.

For example, in a case of a three-layer neural network, when a plurality of inputs are input to an input layer, values thereof are multiplied by weights and input to an intermediate layer, and furthermore, results thereof are multiplied by weights and output from an output layer. Results of the output vary depending on values of respective weights.

The neural network of the present embodiment outputs the interference alarm prior information (n) as a learning result (inferred value) by so-called supervised learning in accordance with a dataset of the interference information (r) and the machining program information (r) observed by the observation unit 701.

That is, regarding the neural network, the state information (i) in which the interference information (r) and the machining program information (r) are associated with each other is input to the input layer, a weight is adjusted for a result output from the output layer, and thereby the interference alarm prior information (n) is output as the learning result (inferred value).

The neural network can also learn the interference alarm prior information (n) by so-called unsupervised learning. Unsupervised learning is a learning method in which only a large amount of input data is given to the machine learning device 70 to thereby learn how the input data are distributed, and learn, without corresponding teaching data (output data) being given, by performing compression, classification, shaping, and the like on the input data. In unsupervised learning, clustering or the like can be performed on features in datasets so as to be grouped into clusters of similar features. In unsupervised learning, with the use of a result of the clustering, some criterion is set and assignment of outputs leading to optimization of the criterion is performed, and thereby prediction of the outputs can be realized.

The machine learning device 70 may output the interference alarm prior information (n) as the learning result (inferred value) in accordance with datasets created for a plurality of numerical controllers. The machine learning device 70 may acquire the datasets from the plurality of numerical controllers used in the same site, or may learn the interference alarm prior information (n) using the datasets collected from the numerical controllers of the plurality of machine tools 100 operating independently in different sites. Furthermore, in the middle of the learning, the machine learning device 70 can add a numerical controller as a target from which the datasets are collected, or conversely, can disconnect the numerical controller from such targets. In addition, the machine learning device 70 that has performed learning with a certain numerical controller may be attached to another numerical controller, and the another numerical controller may relearn the state information (i) and update the interference alarm prior information (n).

As a learning algorithm used in the machine learning device 70, deep learning that learns extraction of a feature quantity itself can also be used. The machine learning device 70 may perform machine learning in accordance with other known methods, such as genetic programming, functional logic programming, or support vector machines.

The interference alarm prior information (n) learned in this manner is input to the interference check processing unit 382. When the interference alarm prior information (n) indicating occurrence of interference is input, the interference check processing unit 382 performs an alarm process illustrated in step S11 in FIG. 6, stops the machine tool 100, the robot 60, and the pedestal 23, and displays a collision alarm on the display unit 4.

In the learning by the machine learning device 70, the learning is performed on the basis of the machining program information (r), and therefore, the machine can be stopped not immediately before mechanical interference but at a block end of a previous block of a block in the machining program in which the mechanical interference is inferred, and the mechanical interference can be prevented more safely. Incidentally, in a case where the machine tool 100 or the robot 60 is stopped immediately before mechanical interference, depending on the moving speed of the machine tool 100 or the robot 60, it may take time to stop, and mechanical interference may occur very occasionally. In a case where the interference definition area is defined to be the same size as the size of an interference, a margin before reaching the stop is small, and mechanical interference may occur.

As described above, in the fourth embodiment, the machine learning device 70 learns the interference alarm prior information (n) on the basis of the state information (i) in which the interference information (r) and the machining program information (r) are associated with each other. Therefore, the machine can be stopped at a block end of a previous block of a block in the machining program in which the mechanical interference is inferred, and the mechanical interference can be prevented more safely.

Fifth Embodiment

Figure 12:
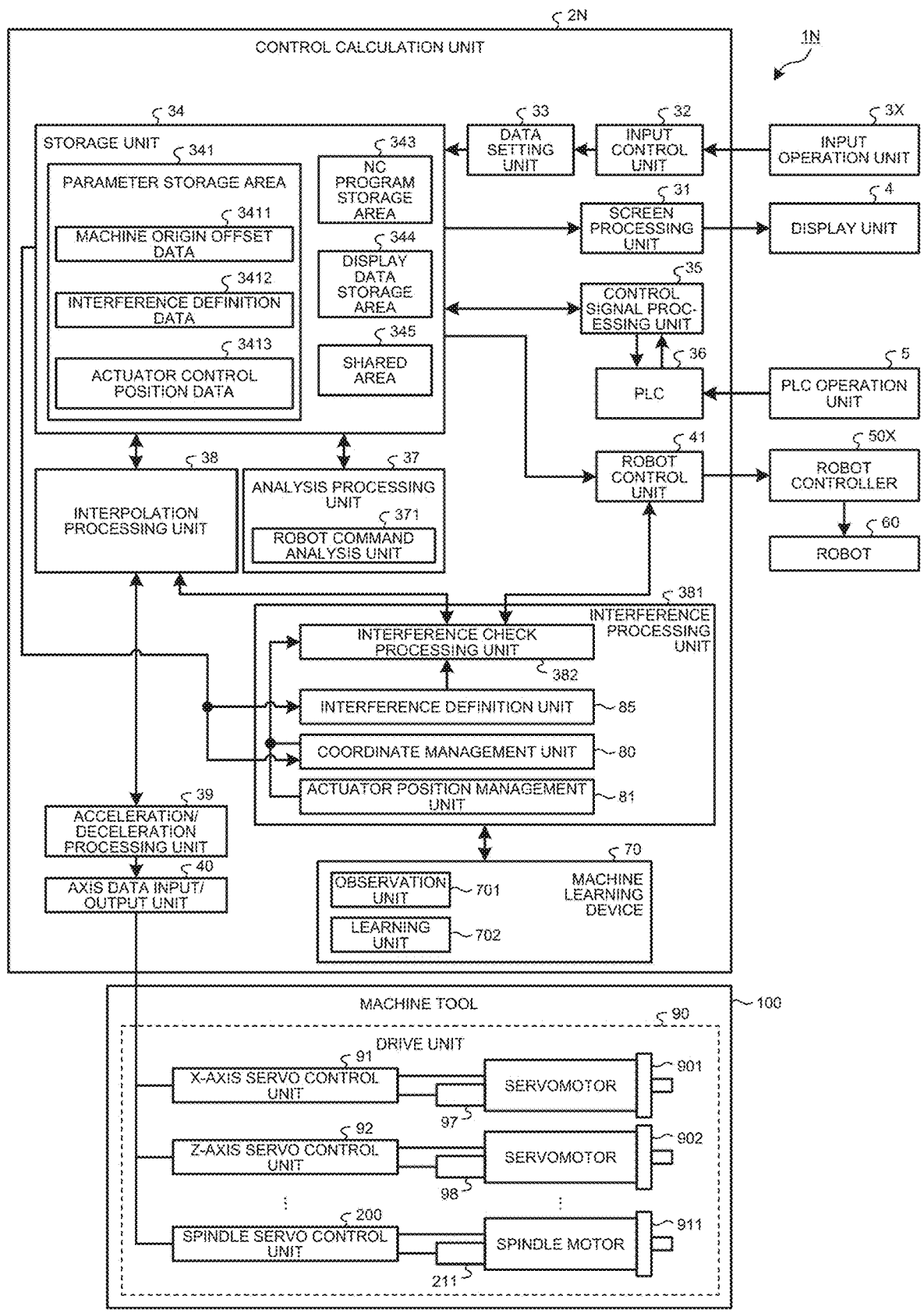
FIG. 12 is a block diagram illustrating an example configuration of a numerical controller according to a fifth embodiment.

Next, a fifth embodiment of the invention will be described with reference to FIG. 12. FIG. 12 is a block diagram illustrating an example configuration of a numerical controller 1N according to the fifth embodiment. The control calculation unit 2N of the numerical controller 1N in FIG. 12 is obtained by adding the machine learning device 70 to the numerical controller 1Y illustrated in FIG. 8. Regarding components among components in FIG. 12 that achieve the same functions as those of the numerical controller 1Y illustrated in FIG. 8, the same reference signs are assigned thereto, and repetitive descriptions thereof will be omitted.

Similarly to FIG. 11, the machine learning device 70 includes the observation unit 701 and the learning unit 702. The machine learning device 70 learns mechanical interference between the machine tool 100 and the robot 60 by using the interference information (r) and the machining program information during interference (r) to infer the interference alarm prior information (n) for notifying the interference check processing unit 382 of occurrence of interference in advance. The interference information (r) includes interference definition data related to the interference definition area 100A of the machine tool 100 when mechanical interference occurs and interference definition data related to the interference definition area 60A of the robot 60 when mechanical interference occurs. The machining program information during interference (r) includes machining program information during interference analyzed by the analysis processing unit 37. The interference alarm prior information (n) is input to the interference check processing unit 382. When the interference alarm prior information (n) indicating occurrence of interference is input, the interference check processing unit 382 performs an alarm process illustrated in step S111 in FIG. 9, stops the machine tool 100, the robot 60, and the actuator 504, and displays a collision alarm on the display unit 4.

As described above, in the fifth embodiment, the machine learning device 70 learns the interference alarm prior information (n) on the basis of the state information (i) in which the interference information (r) and the machining program information (r) are associated with each other. Therefore, the machine can be stopped not immediately before mechanical interference but at a block end of a previous block of a block in the machining program in which the mechanical interference is inferred, and the mechanical interference can be prevented more safely. For example, it is possible to stop the actuator before execution of the actuator movement command (M code) (before the actuator moves).

Sixth Embodiment

Figure 13:
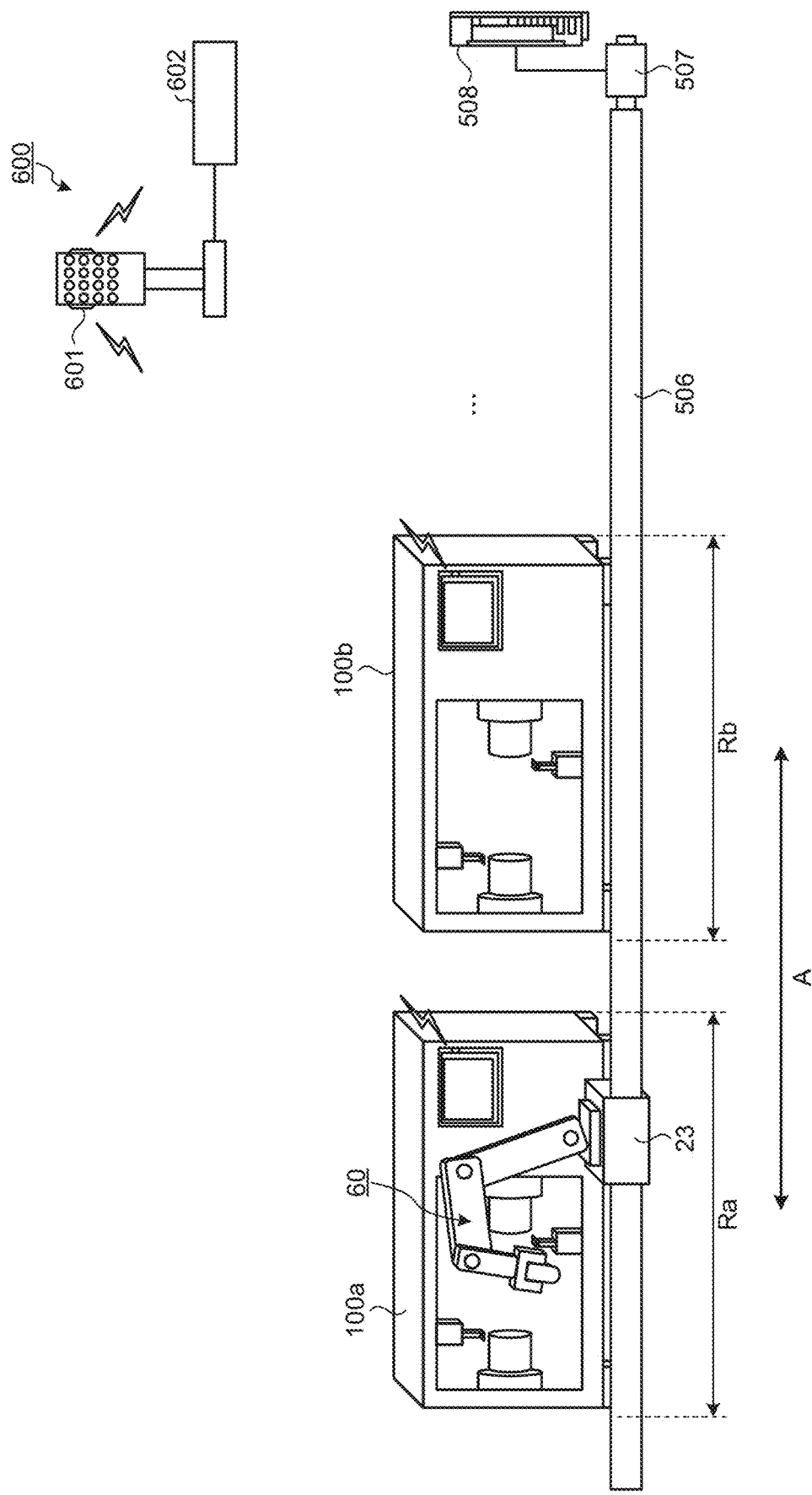
FIG. 13 is a view illustrating an example configuration of an industrial machine control system of a sixth embodiment.

An industrial machine control system of a sixth embodiment will be described with reference to FIGS. 13, 14, and 15. FIG. 13 is a view illustrating an example configuration of the industrial machine control system of the sixth embodiment. The industrial machine control system illustrated in FIG. 13 includes a plurality of machine tools 100*a*, 100*b*, . . . , the robot 60 including the movable pedestal 23, a servomotor 507 and a servo amplifier 508 that move the pedestal 23, a plurality of numerical controllers 1Z, 1Z, . . . , that control the machine tools 100*a*, 100*b*, . . . , and the robot 60, and a local wireless communication facility 600. The machine tool 100*a* corresponds to a first industrial machine that machines a first workpiece, the robot 60 corresponds to a second industrial machine, the machine tool 100*b* corresponds to a third industrial machine that machines a second workpiece, the numerical controller 1Z that controls the machine tool 100*a* corresponds to a first numerical controller, and the numerical controller 1Z that controls the machine tool 100*b* corresponds to a second numerical controller.

In the industrial machine control system illustrated in FIG. 13, the pedestal 23 of the robot 60 is configured to move in the arrow A direction among the plurality of machine tools 100*a*, 100*b*, . . . , arranged side by side. The pedestal 23 is moved in the arrow A direction by a rotational movement conversion mechanism 506 extending over the plurality of machine tools 100*a*, 100*b*, . . . . The rotational movement conversion mechanism 506 is coupled to the servomotor 507, and moves and operates by the rotation of the servomotor 507. The servomotor 507 is, for example, a general-purpose servomotor, and is driven by the general-purpose servo amplifier 508. The servo amplifier 508 includes a wireless data input/output unit (not illustrated) and a wireless antenna (not illustrated).

In the numerical controllers 1Z of the machine tools 100*a*, 100*b*, . . . , machine tool areas Ra, Rb, . . . , each for determining whether the pedestal 23 of the robot 60 is located in an area covered by the corresponding numerical controller 1Z, are defined. The machine tool area Ra is a work area belonging to an area covered by the machine tool 100*a*. The machine tool area Rb is a work area to which the machine tool 100*b* belongs. In the case of the machine tool 100*a*, the interference check is performed when the pedestal 23 of the robot 60 is located in the machine tool area Ra. In the case of the machine tool 100*b*, the interference check is performed when the pedestal 23 of the robot 60 is located in the machine tool area Rb.

In the industrial machine control system, data communication among the plurality of numerical controllers 1Z, the robot 60, and the servo amplifier 508 is performed using wireless communication. As wireless communication in the industrial machine control system, for example, a fifth-generation mobile communication system (5G) is adopted. The industrial machine control system includes the local wireless communication facility 600. The local wireless communication facility 600 includes an antenna 601 and a local wireless base device 602. The local wireless communication facility 600 is not limited to the present configuration, and is configured with an optimum configuration depending on an area environment in which the local wireless communication facility 600 is used.

By using 5G communication, the numerical controller 1Z of each of the machine tools 100*a*, 100*b*, . . . , can receive data of a general-purpose servo amplifier without installing wires in a large production system. In addition, since the 5G communication has a low latency (4 msec), each numerical controller 14 can receive position data of the servo amplifier 508. Furthermore, low latency communication of 1 msec is also possible by introducing a technique of ultra-reliable and low latency communications (URLLC). Regarding wireless communication, not only local 5G but also 5G small cell facility may be used. Low latency communication of the Wi-Fi (registered trademark) 6 wireless standard may be used. At that time, regarding configurations of the numerical controllers and the general-purpose servo amplifier, a Wi-Fi (registered trademark) 6 communication data input/output unit is included instead of a 5G communication data input/output unit.

Figure 14:
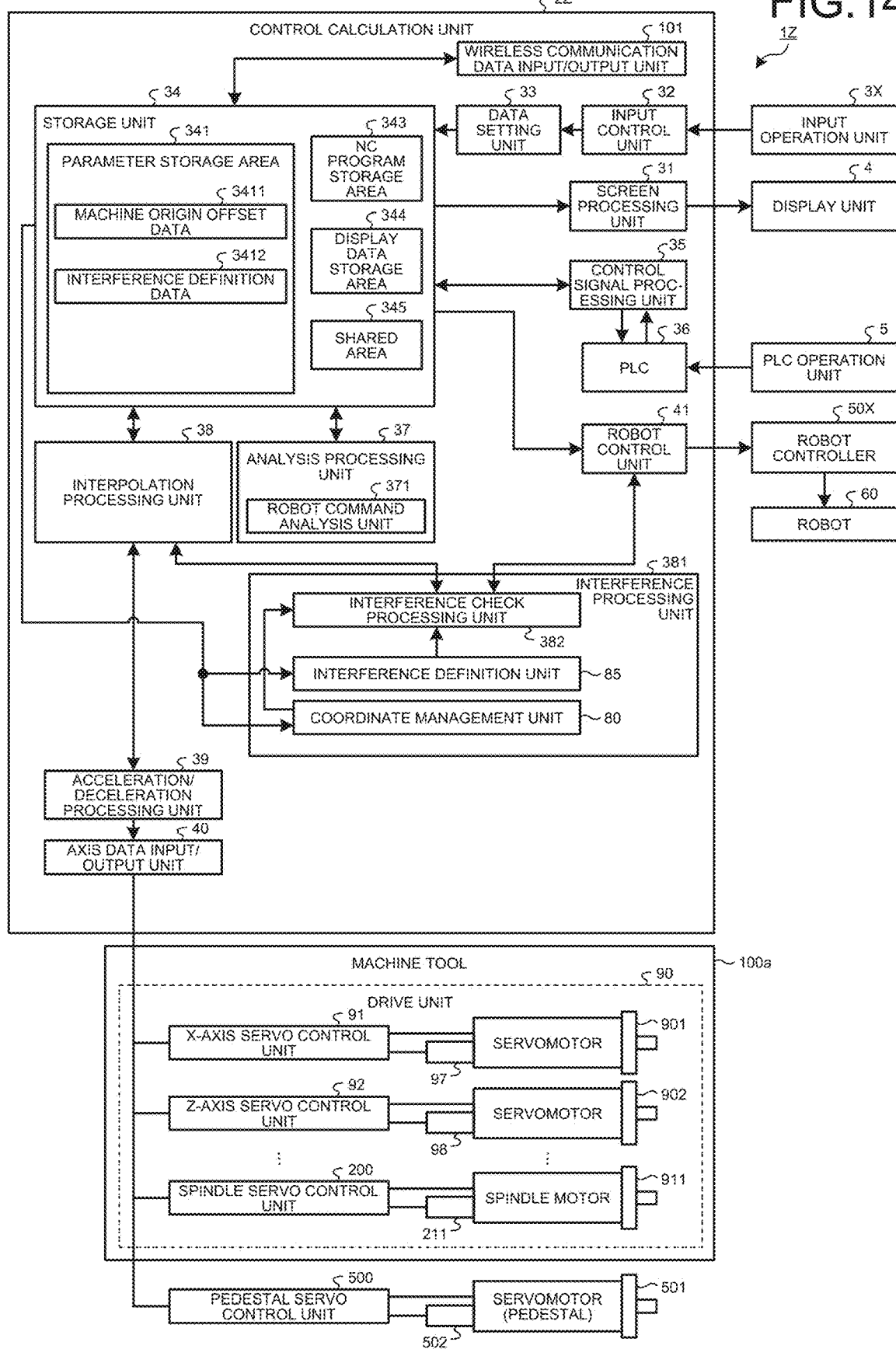
FIG. 14 is a block diagram illustrating an example configuration of a numerical controller of the sixth embodiment.
Figure 15:
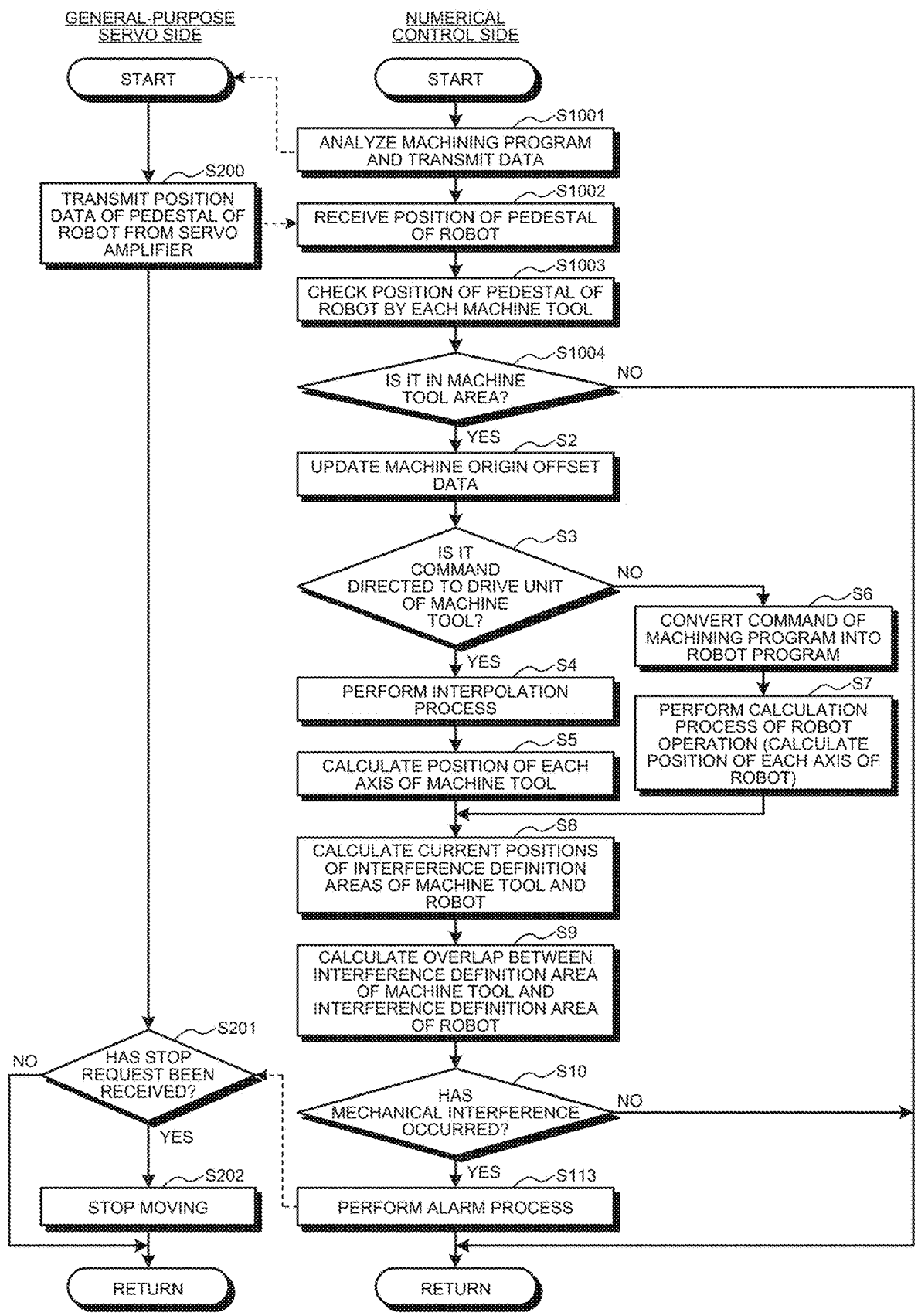
FIG. 15 is a flowchart illustrating operation procedures of a control calculation unit of each numerical controller of the sixth embodiment and a servo amplifier.

FIG. 14 is a block diagram illustrating an example configuration of the numerical controller 1Z of the sixth embodiment. FIG. 14 illustrates a configuration of the numerical controller 1Z that controls the machine tool 100*a*. The numerical controllers 1Z that control other machine tools 100*b*, . . . , (a plurality of machine tools) each have a similar configuration. The numerical controller 1Z of the sixth embodiment is obtained by adding a wireless communication data input/output unit 101 to the numerical controller 1X of the first embodiment illustrated in FIG. 3. Regarding components among components in FIG. 14 that achieve the same functions as those of the numerical controller 1X illustrated in FIG. 3, the same reference signs are assigned thereto, and repetitive descriptions thereof will be omitted. A wireless antenna connected to the wireless communication data input/output unit 101 is not illustrated.

The wireless communication data input/output unit 101 of each numerical controller 1Z transmits and receives data to and from the servo amplifier 508 including the wireless data input/output unit via the local wireless communication facility 600. In such data to be transmitted and received, a current position (machine position or the like) of the servo amplifier 508, start and stop commands to the servo amplifier 508, and the like, are included.

In addition to the interference definition area 100A of the machine tool 100*a* and the interference definition area 60A of the robot 60, the interference definition data 3412 stored in the parameter storage area 341 of the storage unit 34 includes machine tool area data that defines the machine tool area Ra.

An operation of each numerical controller 1Z, an operation of the robot 60, and operations of the servo amplifier 508 and the servomotor 507 that drive the pedestal 23 will be described with reference to the flowchart of FIG. 15. FIG. 15 is a flowchart illustrating operation procedures of the control calculation unit 2Z of each numerical controller 1Z and the servo amplifier 508. The processes in FIG. 15 are performed during a read-ahead process of the numerical controller 1Z. The processes in FIG. 15 illustrate an operation in a case where the pedestal 23 of the robot 60 moves among the plurality of machine tools 100.

The analysis processing unit 37 analyzes a machining program stored in the NC program storage area 343, that is, a command to the drive unit 90. The analysis processing unit 37 also analyzes a robot pedestal movement command which is a command to move the pedestal 23 of the robot 60, and passes the analyzed command to the wireless communication data input/output unit 101 via the shared area 345. The wireless communication data input/output unit 101 wirelessly transmits the command to the servo amplifier 508 via the local wireless communication facility 600. The robot command analysis unit 371 of the analysis processing unit 37 analyzes a machining program for operating the robot 60 (step S1001).

It is assumed that the command directed to the servomotor 507 analyzed by the analysis processing unit 37 is, for example, "B1000 Z100. F1000". The analysis processing unit 37 analyzes the "B1000 Z100. F1000" and passes a start command directed to the servomotor 507, F1000 which is a speed command, and a command including an endpoint position 100. to the wireless communication data input/output unit 101 via the shared area 345. The wireless communication data input/output unit 101 wirelessly transmits the start command with respect to the servomotor 507, the speed command, and the endpoint position to the servo amplifier 508 via the local wireless communication facility 600.

When receiving the start command, the speed command, and the endpoint position, the servo amplifier 508 drives the servomotor 507 to start moving the pedestal 23 of the robot 60. The servo amplifier 508 acquires a current position of the moving pedestal 23 of the robot 60 from current command position data or feedback data of the servomotor 507, and transmits the acquired current position of the pedestal 23 to each numerical controller 1Z via the local wireless communication facility 600 (step S200). The servo amplifier 508 wirelessly transmits the current position of the moving pedestal 23 to each numerical controller 1Z at certain time intervals until the endpoint position 100. is reached.

When receiving the current position of the pedestal 23 via the local wireless communication facility 600, the wireless communication data input/output unit 101 of the numerical controller 1Z of each of the plurality of machine tools 100*a*, 100*b*, . . . , passes the received current position of the pedestal 23 to the coordinate management unit 80 via the shared area 345 (step S1002).

The coordinate management unit 80 of each numerical controller 1Z uses the received current position of the pedestal 23 and data of corresponding one of the machine tool areas Ra, Rb, . . . , to determine whether the pedestal 23 of the robot 60 is located in the machine tool area (steps S1003 and S1004). For example, in the numerical controller 1Z of the machine tool 100*a*, the coordinate management unit 80 determines whether the pedestal 23 of the robot 60 is located in the machine tool area Ra.

If the pedestal 23 of the robot 60 is located in the machine tool area (step S1004: Yes), the processes from steps S2 to S10 described with reference to FIG. 6 are performed. That is, if it is determined "Yes" in step S1004, the interference check is performed. If the pedestal 23 of the robot 60 is not located in the machine tool area (step S1004: No), the processing procedure is returned to step S1001.

In step S2, the coordinate management unit 80 calculates the machine origin O2 of the robot 60 on the basis of the current position of the pedestal 23 acquired from the servo amplifier 508. The coordinate management unit 80 calculates the machine origin offset data 3411 on the basis of the calculated machine origin O2 of the robot 60 and the machine origin O1 of the machine tool, and writes the calculated machine origin offset data 3411 in the parameter storage area 341. Thereafter, in steps S3 to S10, processes similar to those in FIG. 6 are performed.

In step S10, if mechanical interference has occurred (step S10: Yes), the interference check processing unit 382 displays an alarm on the display unit 4 and stops the machine tools 100*a*, 100*b*, . . . , the robot 60, and the servomotor 507 (step S113). When the servomotor 507 is stopped, the interference check processing unit 382 notifies the wireless communication data input/output unit 101 of a stop signal via the shared area 345. In step S10, if mechanical interference has not occurred (step S10: No), the processing procedure is returned to step S1001. The wireless communication data input/output unit 101 transmits a stop signal to the servo amplifier 508 via the local wireless communication facility 600. If the stop signal from the numerical controller 1Z has been received (step S201: Yes), the servo amplifier 508 stops the servomotor 507 and stops moving the pedestal 23 of the robot 60 (step S202). If a stop request has not been received (step S201: No), the processing procedure is returned to step S200.

As described above, in the sixth embodiment, even in a system configuration in which the robot 60 moves among the plurality of machine tools 100*a*, 100*b*, . . . , each numerical controller 1Z itself detects mechanical interference between corresponding one of the machine tools 100*a*, 100*b*, . . . , and the robot 60, so that interference between the machine tools 100 and the robot 60 can be avoided.

Figure 16:
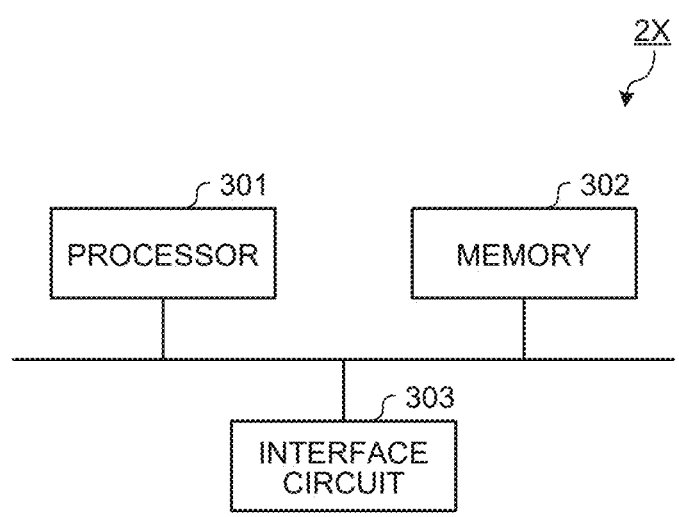
FIG. 16 is a diagram illustrating an example hardware configuration of the control calculation units included in the numerical controllers according to the first to sixth embodiments.

Here, a hardware configuration of the control calculation units 2X, 2Y, 2M, 2N, and 2Z will be described. FIG. 16 is a diagram illustrating an example hardware configuration of the control calculation units included in the numerical controllers according to the first to sixth embodiments. Since the control calculation units 2X, 2Y, 2M, 2N, and 2Z have similar hardware configurations, the hardware configuration of the control calculation unit 2X will be described here.

The control calculation unit 2X can be realized by a processor 301, a memory 302, and an interface circuit 303 illustrated in FIG. 16. Examples of the processor 301 include a central processing unit (CPU, also referred to as a processing device, an arithmetic device, a microprocessor, a microcomputer, a processor, or a digital signal processor (DSP)), and system large scale integration (LSI). Examples of the memory 302 include a random access memory (RAM) and a read only memory (ROM).

The control calculation unit 2X is realized by the processor 301 reading and executing a program stored in the memory 302 for performing an operation of the control calculation unit 2X. It can also be said that the program causes a computer to execute procedures or methods of the control calculation unit 2X. The memory 302 is also used as a temporary memory when the processor 301 performs various processes.

A part of the functions of the control calculation unit 2X may be realized by dedicated hardware and another part thereof may be realized by software or firmware. The machine learning device 70 may be realized by the hardware illustrated in FIG. 16.

The configurations described in the embodiments above are merely examples of the content of the present invention and can be combined with other known technology and part thereof can be omitted or modified without departing from the gist of the present invention.

REFERENCE SIGNS LIST

1M, 1N, 1X, 1Y, 1Z numerical controller; 2M, 2N, 2X, 2Y, 2Z control calculation unit; 3X input operation unit; 4 display unit; 5 PLC operation unit; 5*a*, 5*b* workpiece to be machined; 6*a*, 6*b* tool; 11*a*, 11*b* tool holder; 12*a*, 12*b* chuck mechanism; 14 housing; 21 robot arm; 22 robot hand; 23 pedestal; 31 screen processing unit; 32 input control unit; 33 data setting unit; 34 storage unit; 35 control signal processing unit; 37 analysis processing unit; 38 interpolation processing unit; 39 acceleration/deceleration processing unit; 40 axis data input/output unit; 41 robot control unit; 50X robot controller; 60 robot; 60A, 100A interference definition area; 70 machine learning device; 80 coordinate management unit; 81 actuator position management unit; 85 interference definition unit; 90 drive unit; 91 X-axis servo control unit; 92 Z-axis servo control unit; 97, 98, 211, 502 detector; 100, 100a, 100b machine tool; 101 wireless communication data input/output unit; 200 spindle servo control unit; 341 parameter storage area; 343 NC program storage area; 344 display data storage area; 345 shared area; 371 robot command analysis unit; 381 interference processing unit; 382 interference check processing unit; 500 pedestal servo control unit; 501, 507, 901, 902 servomotor; 503, 506 rotational movement conversion mechanism; 504 actuator; 508 servo amplifier; 600 local wireless communication facility; 601 antenna; 602 local wireless base device; 701 observation unit; 702 learning unit; 911 spindle motor; 3411 machine origin offset data; 3412 interference definition data; 3413 actuator control position data; O1 machine origin of machine tool; O2 machine origin of robot.

The invention claimed is:

1. A numerical controller that controls a first industrial machine having a first coordinate system and a second industrial machine having a second coordinate system and being movable, the numerical controller comprising:
a coordinate management circuitry to update machine origin offset data indicating a positional relationship between a first machine origin that is a machine origin of the first industrial machine and a second machine origin that is a machine origin of the second industrial machine depending on movement of the first machine origin or the second machine origin;
interference check processing circuitry to acquire position feedback data of movable portions of the first industrial machine and position feedback data of movable portions of the second industrial machine on a basis of a position in the first coordinate system of a first interference definition area obtained by modeling the first industrial machine, a position in the second coordinate system of a second interference definition area obtained by modeling the second industrial machine, and the updated machine origin offset data, to calculate a current position of the interference definition area of the first industrial machine on a basis of the position feedback data of the movable portions of the first industrial machine, and to calculate a current position of the interference definition area of the second industrial machine on a basis of the position feedback data of the movable portions of the second industrial machine; and
control circuitry configured to output a stop signal to stop at least one of the first industrial machine and the second industrial machine when the interference between the first industrial machine and the second industrial machine is detected.

2. The numerical controller according to claim 1, wherein the first industrial machine includes a plurality of first axes for machining a workpiece,
the second industrial machine includes a plurality of second axes for machining the workpiece on a movable pedestal,
the coordinate management, circuitry updates the machine origin offset data depending on movement of the pedestal, and
the interference check processing circuitry successively calculates a position of the first interference definition area on a basis of first interference definition data related to the first interference definition area obtained by modeling the first industrial machine by the first coordinate system based on the first machine origin and position data of the plurality of first axes, successively calculates a position of the second interference definition area on a basis of second interference definition data related to the second interference definition area obtained by modeling the second industrial machine by the second coordinate system based on the second machine origin and position data of the plurality of second axes, and detects interference between the first industrial machine and the second industrial machine on a basis of the position of the first interference definition area and the position of the second interference definition area that have been calculated and the updated machine origin offset data.

3. The numerical controller according to claim 2, wherein the second industrial machine includes a servomotor that moves and drives the pedestal, and
the coordinate management circuitry updates the machine origin offset data on a basis of position command data or position feedback data of the servomotor.

4. The numerical controller according to claim 2, wherein the second industrial machine includes an actuator that moves and drives the pedestal, and
the coordinate management circuitry updates the machine origin offset data on a basis of position data of the actuator.

5. The numerical controller according to claim 1, wherein the first industrial machine is a machine tool, and the second industrial machine is a robot.

6. The numerical controller according to claim 1, further comprising:
a machine learning device to learn detection of interference between the first industrial machine and the second industrial machine, wherein
the machine learning device includes:
an observation circuitry that acquires, from the interference check processing circuitry, interference information including position information of the first interference definition area when interference is detected and position information of the second interference definition area when interference is detected, and outputs state information in which the interference information and machining program information during interference are associated with each other; and
a learning circuitry that learns the state information and outputs, to the interference check processing circuitry, interference alarm prior information that is information in which presence or absence of interference is inferred.

7. An industrial machine control system comprising a first industrial machine having a first coordinate system, a third industrial machine having a third coordinate system, a second industrial machine having a second coordinate system and being movable, a first numerical controller to control the first industrial machine and the second industrial machine, and a second numerical controller to control the second industrial machine and the third industrial machine, wherein
the first numerical controller includes:
a coordinate management circuitry that updates first machine origin offset data indicating a positional relationship between a first machine origin that is a machine origin of the first industrial machine and a second machine origin that is a machine origin of the second industrial machine depending on movement of the first machine, origin or the second machine origin; and an interference check processing circuitry that determines whether the second industrial machine has entered a work area of the first industrial machine, and, in a case where the second industrial machine has entered the work area of the first industrial machine, detects interference between the first industrial machine and the second industrial machine on a basis of a position in the first coordinate system of a first interference definition area obtained by modeling the first industrial machine, a position in the second coordinate system of a second interference definition area obtained by modeling the second industrial machine, and the updated first machine origin offset data.

8. The industrial machine control system according to claim 7, wherein the first industrial machine includes a plurality of first axes for machining a first workpiece, the third industrial machine includes a plurality of third axes for machining a second workpiece, the second industrial machine includes a plurality of second axes for machining the first workpiece and the second workpiece on a pedestal that is movable in an area including the first industrial machine and the third industrial machine, the coordinate management circuitry of the first numerical controller updates the first machine origin offset data depending on movement of the pedestal, and in a case where the second industrial machine has entered the work area of the first industrial machine, the interference check processing circuitry of the first numerical controller successively calculates a position of the first interference definition area on a basis of first interference definition data related to the first interference definition area obtained by modeling the first industrial machine by the first coordinate system based on the first machine origin and position data of the plurality of first axes, successively calculates a position of the second interference definition area on a basis of second interference definition data related to the second interference definition area obtained by modeling the second industrial machine by the second coordinate system based on the second machine origin and position data of the plurality of second axes, and detects interference between the first industrial machine and the second industrial machine on a basis of the position of the first interference definition area and the position of the second interference definition area that have been calculated and the updated first machine origin offset data.

9. The industrial machine control system according to claim 8, wherein the second numerical controller includes:

a coordinate management circuitry that updates second machine origin offset data indicating a positional relationship between a third machine origin that is a machine origin of the third industrial machine and a second machine origin that is a machine origin of the second industrial machine depending on movement of the pedestal; and an interference check processing circuitry that determines whether the pedestal has entered a work area of the third industrial machine, and, in a case where the pedestal has entered the work area of the third industrial machine, successively calculates a position of a third interference definition area on a basis of third interference definition data related to the third interference definition area obtained by modeling the third industrial machine by a third coordinate system based on the third machine origin and position data of the plurality of third axes, successively calculates a position of the second interference definition area on a basis of second interference definition data related to the second interference definition area and position data of the plurality of second axes, and detects interference between the third industrial machine and the second industrial machine on a basis of the position of the third interference definition area and the position of the second interference definition area that have been calculated and the updated second machine origin offset data.

10. The industrial machine control system according to claim 8, further comprising a servomotor to move and drive the pedestal, and a servo amplifier to drive the servomotor, wherein the first industrial machine, the third industrial machine. and the servo amplifier transmit and receive commands and data thereamong by wireless network communication.

* * * * *